US012717877B2

(12) United States Patent
Galvin

(10) Patent No.: US 12,717,877 B2
(45) Date of Patent: Aug. 25, 2026

(54) SYSTEM AND METHOD FOR ADAPTIVE GEOMETRIC DIFFUSION PROJECTION ONTO MANIFOLDS

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/393,493

(22) Filed: Nov. 18, 2025

(65) Prior Publication Data

US 2026/0187195 A1 Jul. 2, 2026

Related U.S. Application Data

(63) Continuation-in-part of application No. 19/203,069, filed on Jun. 3, 2025, now Pat. No. 12,481,688, which (Continued)

(51) Int. Cl.
*G06F 18/2137* (2023.01)
*G06F 18/21* (2023.01)

(Continued)

(52) U.S. Cl.
CPC .. *G06F 18/21375* (2023.01); *G06F 18/21324* (2023.01); *G06F 18/217* (2023.01); *G06F 18/24147* (2023.01)

(58) Field of Classification Search
CPC ......... G06F 18/21375; G06F 18/21324; G06F 18/217; G06F 18/24147
See application file for complete search history.

(56) References Cited

U.S. PATENT DOCUMENTS

2004/0083195 A1 4/2004 McCord et al.
2005/0060130 A1* 3/2005 Shapiro .................. G06F 30/23 703/2

(Continued)

*Primary Examiner* — Chuen-Meei Gan
(74) *Attorney, Agent, or Firm* — GALVIN PATENT LAW LLC; Brian R. Galvin

(57) ABSTRACT

A system and method for adaptive geometric diffusion projection enables mapping of heterogeneous high-dimensional representations onto a shared low-dimensional manifold without neural network training. The system maintains landmark points in source spaces and computes their spectral coordinates through graph Laplacian eigen decomposition based on semantic similarities. New input points are projected via harmonic extension, computing weighted interpolations of nearby landmark spectral coordinates. A geometric optimization process refines positions while maintaining manifold constraints through tangent space projections. The system continuously monitors geometric invariants including principal angles, spectral gaps, and curvature distributions. When invariants exceed thresholds, targeted adaptations occur: spectral basis updates using warm-started iterations, landmark set augmentation in high-residual regions, or parameter adjustments. The approach supports logarithmic computational scaling, enables streaming operation on continuous data, and handles multimodal inputs through reliability-weighted consensus. The system maintains projection quality indefinitely through continuous geometric monitoring and local adaptations.

20 Claims, 9 Drawing Sheets

Related U.S. Application Data is a continuation-in-part of application No. 19/205,960, filed on May 12, 2025, which is a continuation-in-part of application No. 19/060,794, filed on Feb. 24, 2025, which is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, now Pat. No. 12,602,586, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024.

(60) Provisional application No. 63/879,580, filed on Sep. 10, 2025, provisional application No. 63/651,359, filed on May 23, 2024.

(51) Int. Cl.
*G06F 18/2132* (2023.01)
*G06F 18/2413* (2023.01)

(56) References Cited

U.S. PATENT DOCUMENTS

| | | | | |
|---|---|---|---|---|
| 2009/0235099 | A1 | 9/2009 | Branover et al. | |
| 2014/0122039 | A1* | 5/2014 | Xu | G06F 17/18 703/2 |
| 2018/0096229 | A1* | 4/2018 | Bronstein | G06F 17/14 |
| 2023/0230250 | A1* | 7/2023 | Vianello | G01C 11/06 382/159 |
| 2024/0289395 | A1 | 8/2024 | Zhou et al. | |
| 2025/0085894 | A1 | 3/2025 | Lee et al. | |

* cited by examiner

SYSTEM AND METHOD FOR ADAPTIVE GEOMETRIC DIFFUSION PROJECTION ONTO MANIFOLDS

CROSS-REFERENCE TO RELATED APPLICATIONS

Priority is claimed in the application data sheet to the following patents or patent applications, each of which is expressly incorporated herein by reference in its entirety:

63/879,580
Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 18/918,077
Ser. No. 18/737,906
Ser. No. 18/736,498
63/651,359

BACKGROUND OF THE INVENTION

Field of the Art

The present invention is in the field of computational geometry and machine learning for manifold-based representation learning, and more particularly to adaptive geometric diffusion systems and methods that project heterogeneous, streaming latent states onto a shared low-dimensional Riemannian manifold.

Discussion of the State of the Art

Contemporary manifold learning and projection techniques seek to map high-dimensional latent states into low-dimensional coordinates that preserve neighborhood structure and geodesic continuity. Two broad families dominate current practice. The first relies on neural "projectors" (e.g., autoencoder-style or contrastively trained embeddings) that parameterize a mapping $P_\theta$:S→M with learned weights optimized against a surrogate loss that encodes local topology. These models offer fast inference once trained, but they are tightly coupled to the training distribution: under distributional drift their embeddings can fold or tear, violating smoothness and constant-rank conditions, and must be retrained or continually fine-tuned to restore coherence. Without replay or specialized regularization, such retraining risks catastrophic forgetting of earlier geometry, and loss-based monitoring on drifting data provides only heuristic, unstable signals about geometric degradation.

The second family comprises geometry-first, spectral methods that derive coordinates from graph Laplacians, then attach new points by out-of-sample extension. In practice, these pipelines concentrate global computation on a smaller representative set (e.g., landmarks) to keep spectral costs bounded, while mapping new samples by querying nearby representatives and solving a closed-form barycentric assignment. This division, bounded landmark spectra plus local out-of-sample extension, keeps per-point mapping effectively constant and amortizes global refreshes. However, classical deployments of such methods in streaming settings still struggle with principled, on-line control of topology, curvature, and injectivity during incremental updates, and with objective triggers for when to revisit the global spectrum.

Across both families, modern production requirements add further pressure. Systems must operate on long-horizon, multimodal streams; they must be composable across federated sites without sharing raw data; and they must scale sublinearly with cumulative experience. In neural approaches, integrating multiple modalities or federated sources typically necessitates joint retraining on pooled data, often infeasible under privacy constraints, and provides no natural way to merge separately trained models. In contrast, geometry-first approaches can, in principle, compose modalities via kernel design and exchange low-rank spectral summaries across sites, but the field lacks widely adopted invariants and thresholds to govern when to promote new representatives, when to refresh spectra, and how to bound local corrective updates so as to preserve manifold regularity under chaotic drift.

A further gap in the art concerns reliability monitoring and adaptation. Robust operation over time calls for measurable geometric invariants, such as principal-angle drift between successive eigenspaces, spectral gap ratios, curvature bands, injectivity radii, and residuals of the out-of-sample map—to trigger targeted, local corrections (e.g., landmark promotion or limited spectral refresh) rather than wholesale retraining or full recomputation. Existing neural pipelines generally expose only aggregate validation losses, which are ill-posed under nonstationarity; even geometry-first systems often lack standardized guardrails linking invariant thresholds to specific adaptation actions.

Finally, state-of-the-art systems are constrained by computational scaling. Neural projectors incur training costs proportional to cumulative experience and recurrent fine-tuning under drift, while geometry-first pipelines achieve better asymptotics when global spectra are confined to landmarks and per-point attachment is local, yet practical streaming deployments still need clear scaling laws that relate cache size, refresh frequency, and maintenance cost over long horizons.

What is needed is a system and method for adaptive geometric diffusion projection that exposes online geometric invariants (eigenspace drift, spectral-gap ratios, curvature/injectivity bands, out-of-sample residuals) as first-class monitors; couples them to targeted, local updates (landmark promotion, harmonic extension, constrained on-manifold compression flows) instead of wholesale retraining; composes across modalities and federated sites via privacy-preserving, low-rank spectral summaries; and sustains sublinear maintenance while preserving smoothness, constant-rank embeddings, and geodesic fidelity.

SUMMARY OF THE INVENTION

Accordingly, the inventor has conceived and reduced to practice, a system and method for adaptive geometric diffusion projection enables mapping of heterogeneous high-dimensional representations onto a shared low-dimensional manifold without neural network training. The system maintains landmark points in source spaces and computes their spectral coordinates through graph Laplacian eigen decomposition based on semantic similarities. New input points are projected via harmonic extension, computing weighted interpolations of nearby landmark spectral coordinates. A geometric optimization process refines positions while maintaining manifold constraints through tangent space projections. The system continuously monitors geometric invariants including principal angles, spectral gaps, and curvature distributions. When invariants exceed thresholds, targeted adaptations occur: spectral basis updates using warm-started iterations, landmark set augmentation in high-residual regions, or parameter adjustments.

According to a preferred embodiment, a projection system for mapping heterogeneous high-dimensional representations onto a shared manifold is disclosed, comprising: a processor; a memory storing instructions that, when executed by the processor, cause the system to: maintain a set of landmark points in one or more source spaces; compute spectral coordinates for the landmark points based on a graph constructed using semantic similarity relationships between the landmark points; receive an input point from a source space; determine manifold coordinates for the input point by: identifying a subset of semantically similar landmarks; computing interpolation weights based on semantic distances; and calculating a weighted combination of spectral coordinates of the identified landmarks; refine the determined manifold coordinates through a geometric optimization process that maintains local manifold constraints; and monitor one or more geometric invariants of the manifold and adaptively update at least one of the landmark points or the spectral coordinates when a monitored geometric invariant exceeds a threshold.

According to another preferred embodiment, a computer-implemented method for projecting heterogeneous high-dimensional representations onto a shared manifold is disclosed, comprising the steps of: maintaining a set of landmark points in one or more source spaces; computing spectral coordinates for the landmark points based on a graph constructed using semantic similarity relationships between the landmark points; receiving an input point from a source space; determining manifold coordinates for the input point by: identifying a subset of semantically similar landmarks; computing interpolation weights based on semantic distances; and calculating a weighted combination of spectral coordinates of the identified landmarks; refining the determined manifold coordinates through a geometric optimization process that maintains local manifold constraints; and monitoring one or more geometric invariants of the manifold and adaptively updating at least one of the landmark points or the spectral coordinates when a monitored geometric invariant exceeds a threshold.

According to a further aspect, the method includes constructing a kernel matrix using exponential weights of semantic distances between landmark points; generating a normalized graph Laplacian from the kernel matrix; and performing eigen decomposition to obtain eigenvectors that define the spectral coordinates.

According to a further aspect, the method includes computing a gradient of a geometric energy functional that includes at least one of a semantic coherence term, a curvature penalty term, a density regularization term, or a chart conditioning term; projecting the gradient onto a local tangent space estimated from neighboring manifold points; and updating the manifold coordinates using a step size bounded by local geometric constraints.

According to a further aspect, the method includes one or more geometric invariants comprising at least one of principal angles between a current spectral basis and a reference spectral basis, a spectral gap ratio computed as a difference between consecutive eigenvalues divided by the smaller eigenvalue, statistical measures of local curvature across the manifold, or an injectivity radius estimate based on minimum distances between manifold points.

According to a further aspect, the method includes receiving input points from a plurality of heterogeneous source spaces corresponding to different modalities; maintaining separate semantic metrics for each modality; and computing consensus manifold coordinates by weighted combination of modality-specific projections.

According to a further aspect, the method includes computing reliability scores for each modality based on at least one of projection residuals, temporal stability, or cross-modal consistency; adaptively updating weights for each modality based on the reliability scores; and applying the updated weights when computing consensus manifold coordinates.

According to a further aspect, the method includes identifying regions of the source space with projection residuals exceeding a coverage threshold; selecting candidate points from high-residual regions based on at least one of centrality, stability, or representativeness; and adding selected candidates to the set of landmark points.

According to a further aspect, the method includes storing the determined manifold coordinates in a manifold store; maintaining a nearest neighbor index structure on the manifold coordinates to support efficient neighborhood queries; and updating only local neighborhoods affected by new input points during the geometric optimization process.

According to a further aspect, the method includes using previous spectral coordinates as initial conditions for an iterative eigen decomposition solver; performing warm-started iterations until convergence; and broadcasting rotation matrices to align existing manifold coordinates with updated spectral coordinates.

According to a further aspect, the method includes maintaining the landmark points and spectral coordinates in a federated manner across multiple sites; sharing only spectral coefficients and landmark summaries between sites without sharing raw data; and aligning spectral bases across sites using a common set of anchor points.

BRIEF DESCRIPTION OF THE DRAWING FIGURES

DETAILED DESCRIPTION OF THE INVENTION

Figure 1:
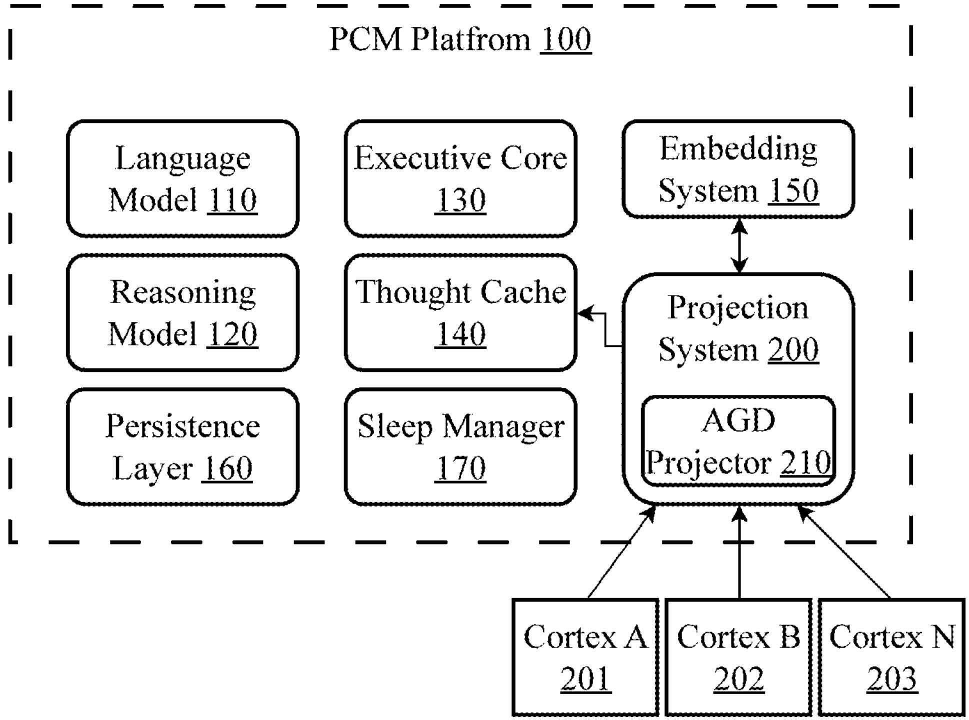
FIG. 1 is a block diagram illustrating the integration of an adaptive geometric diffusion projection system within a persistent cognitive machine architecture, according to an embodiment.

The inventor has conceived, and reduced to practice, a system and method for adaptive geometric diffusion projection enables mapping of heterogeneous high-dimensional representations onto a shared low-dimensional manifold without neural network training. The system maintains landmark points in source spaces and computes their spectral coordinates through graph Laplacian eigen decomposition based on semantic similarities. New input points are projected via harmonic extension, computing weighted interpolations of nearby landmark spectral coordinates. A geometric optimization process refines positions while maintaining manifold constraints through tangent space projections. The system continuously monitors geometric invariants including principal angles, spectral gaps, and curvature distributions. When invariants exceed thresholds, targeted adaptations occur: spectral basis updates using warm-started iterations, landmark set augmentation in high-residual regions, or parameter adjustments. The approach supports logarithmic computational scaling, enables streaming operation on continuous data, and handles multimodal inputs through reliability-weighted consensus.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "Persistent Cognitive Machine" or "PCM" refers to a computing system that maintains persistent cognitive processes regardless of external interaction, can remember previous experiences, learn from these experiences, create new thought experiences independently, and initiate interactions without waiting for external prompts. Unlike traditional AI systems that operate within a promptresponse paradigm, a PCM operates with persistent awareness even when not actively engaged with users or external systems.

As used herein, "thought" refers to a discrete unit of cognition within the persistent cognitive machine, representing information, concepts, observations, inferences, questions, or other cognitive elements that the system processes and stores. Thoughts may be derived from external inputs, generated through internal reasoning processes, or created through recombination of existing thoughts.

As used herein, "thought cache" refers to the component of the persistent cognitive machine that stores, organizes, and provides access to thoughts. The thought cache may include both short-term and long-term storage capabilities, with mechanisms for transferring information between them and organizing thoughts based on semantic relationships.

As used herein, "sleep state" refers to a mode of operation in which the persistent cognitive machine temporarily reduces responsiveness to external stimuli to focus on internal cognitive maintenance processes, including but not limited to memory consolidation, thought generalization, insight generation, and memory reorganization.

Conceptual Architecture

FIG. 1 is a block diagram illustrating the integration of an adaptive geometric diffusion projection system within a persistent cognitive machine architecture, according to an embodiment. The adaptive geometric diffusion projection system 200 represents a fundamental advancement in projection mechanisms for artificial intelligence systems by providing a purely geometric approach to mapping heterogeneous, high-dimensional latent representations onto a shared semantic manifold. Unlike conventional dimensionality reduction techniques that rely on neural network parameterizations or static transformations, the system 200 maintains geometric coherence through adaptive spectral methods while handling chaotic distributional drift without requiring retraining.

At the architectural level, adaptive geometric diffusion projection system 200 operates as an integrated component within the broader persistent cognitive machine platform 100. The PCM platform 100, shown in dashed outline to indicate contextual architecture, comprises several core components including a language model 110 for natural language processing capabilities, a reasoning model 120 for complex analytical tasks, an executive core 130 for orchestrating cognitive processes, a thought cache 140 for storing and organizing cognitive content, an embedding system 150 for vector representations, a persistence layer 160 for maintaining state across system restarts, and a sleep manager 170 for cognitive maintenance operations. The adaptive geometric diffusion projection system 200 interfaces primarily with the embedding system 150 through a bidirectional connection that enables coordinated transformation of representations, and provides output to the thought cache 140 in the form of manifold coordinates that preserve semantic relationships.

The primary function of adaptive geometric diffusion projection system 200 is to serve as a projection operator that transforms multiple heterogeneous input streams into a unified geometric representation. The system receives input from a plurality of cortices, shown as cortex 201, cortex 202, through cortex N 203, each producing latent representations in distinct high-dimensional spaces denoted as S^(1), S^(2), through S^(N) respectively. These cortices may operate in different modalities such as visual processing, auditory analysis, linguistic understanding, temporal reasoning, or other specialized cognitive domains. Each cortex generates latent states with its own dimensional characteristics, distributional properties, and semantic structure, creating a fundamental challenge for unified representation within the cognitive architecture.

The adaptive geometric diffusion projection system 200 addresses this challenge through its core component, the AGD projector 210, which implements a sophisticated geometric transformation. The AGD projector 210 receives the heterogeneous latent spaces S^(N) from the various cortices and maps them onto a shared semantic manifold M, where M is embedded in a low-dimensional space with dimension m significantly smaller than any of the input dimensions. This projection is not merely a dimensionality reduction but a semantic reorganization that ensures points close together on the manifold M represent semantically similar concepts, even if they originated from different cortices or were distant in their original latent spaces.

The output of AGD projector 210 is the semantic manifold M, which serves as a unified geometric substrate for cognitive operations within the PCM platform. This manifold is characterized by several critical properties: it is smooth and differentiable almost everywhere, supporting the computation of geodesics that represent cognitively meaningful trajectories; it preserves semantic relationships through its Riemannian metric structure; and it maintains topological coherence despite the continuous influx of new data points from the streaming cortex inputs. The manifold M feeds directly into the thought cache 140, where manifold coordinates are stored and organized for retrieval during cognitive processes.

The integration between adaptive geometric diffusion projection system 200 and the PCM platform 100 is further enhanced through control signals from executive core 130, which may influence projection parameters, trigger adaptation mechanisms, or request specific projections based on current cognitive requirements. This bidirectional communication ensures that the projection system operates in harmony with the broader cognitive processes of the platform, adapting its geometric structures to support the current cognitive context while maintaining long-term semantic coherence.

In operation, the adaptive geometric diffusion projection system 200 provides several critical capabilities to the persistent cognitive machine architecture. First, it enables the unification of diverse cognitive modalities into a common geometric framework, allowing the system to reason across different types of information seamlessly. Second, it maintains this unification adaptively, handling the natural drift and evolution of latent representations without requiring periodic retraining or catastrophic forgetting. Third, it provides a computationally efficient transformation with complexity that scales logarithmically with accumulated experiences, ensuring long-term viability. These capabilities make the adaptive geometric diffusion projection system 200 an essential component for any cognitive architecture that must integrate multiple sources of high-dimensional information into a coherent, persistent representation.

Figure 2:
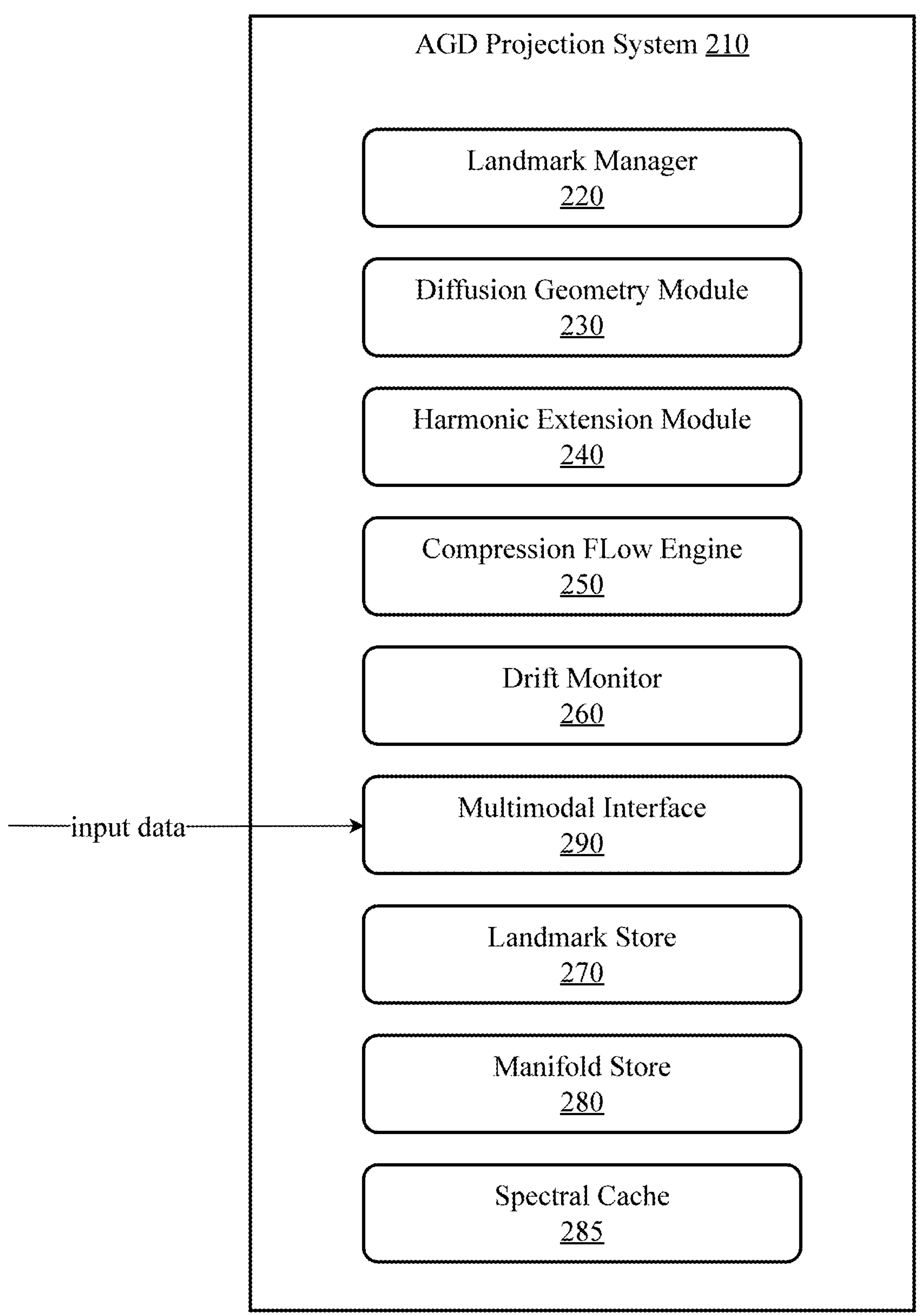
FIG. 2 is a block diagram illustrating an exemplary system architecture for an adaptive geometric diffusion projection system, according to an embodiment.

FIG. 2 is a block diagram illustrating an exemplary system architecture for an adaptive geometric diffusion projection system, according to an embodiment. AGD projector 210 implements a multi-layer geometric transformation pipeline that operates without learned weights or neural network parameterizations. Unlike traditional projection mechanisms that require training and retraining to maintain coherence, AGD projector 210 achieves adaptive projection through purely geometric operations that naturally handle distributional drift, multimodal inputs, and streaming data while maintaining mathematical guarantees about manifold structure and semantic coherence.

AGD projector 210 can be configured to carefully orchestrate collection of modules that transform high-dimensional, heterogeneous latent representations into a unified low-dimensional manifold. The architecture comprises various computational modules and one or more storage components, all designed to operate efficiently on modern GPU hardware while maintaining the geometric invariants necessary for reliable projection. These components enable the systems and methods described herein to realize a projection operator that is simultaneously adaptive to changing distributions, transparent in its operations through explicit geometric monitoring, and computationally efficient with logarithmic scaling in accumulated experiences.

A multimodal interface 290 serves as the entry point for diverse latent representations from multiple cortices. This component receives input streams $S^j$ from various cortical sources, each potentially having different dimensionality, distributional characteristics, and semantic structure. Multimodal interface 290 maintains modality-specific semantic metrics $d^j_{sem}$ that capture the notion of similarity appropriate to each cortex type—for instance, perceptual similarity for visual cortices, syntactic similarity for language cortices, or temporal proximity for sequence-processing cortices. The interface also manages modality weights that reflect the current reliability or importance of each input stream, allowing the system to dynamically adjust its reliance on different cortices based on their stability or relevance. These weights feed into the construction of composite kernels that unify information across modalities while respecting their individual characteristics.

Working in close coordination with the multimodal interface is a landmark manager 220, which maintains a compact set of representative points L that serve as the skeletal structure for the geometric projection. Landmark manager 220 implements adaptive selection strategies to ensure that the landmark set provides adequate coverage of the data distribution while remaining computationally tractable. The size of the landmark set is typically much smaller than the number of data points, following the scaling relationship $|L|=m_\varepsilon >> N$, where N is the number of retained manifold points. The landmark manager continuously monitors the quality of landmark coverage through residual statistics and can promote new landmarks when novel regions of the latent space are discovered. This adaptive landmark maintenance ensures that the projection remains accurate even as the underlying data distribution evolves over time.

Central to the geometric transformation is a diffusion geometry module 230, which constructs and maintains the spectral representation of the landmark graph. This module can be configured to build a semantic kernel K that combines affinity information from all modalities according to their respective weights and semantic metrics. From this kernel, diffusion geometry module 230 computes the normalized graph Laplacian $L_L$ and performs spectral decomposition (also referred to herein as eigen decomposition) to obtain eigenvalues and eigenvectors. The resulting spectral coordinates $\Psi C$ provide a natural parameterization of the manifold that respects the intrinsic geometry of the data rather than its ambient representation. The module selects the top m eigenvectors based on spectral gap analysis, ensuring that the chosen dimensionality captures the essential structure while filtering noise and redundant variations. These spectral coordinates form the canonical basis for the semantic manifold M.

For streaming operation, a harmonic extension module 240 provides the mechanism to attach new data points to the existing manifold structure without global recomputation. When a new point x arrives from cortex j, harmonic extension module 240 identifies the L nearest landmarks in the modality-specific semantic metric and computes attachment weights using an exponential kernel $$w^j_{x\ell} = \exp\left(-\kappa_j d^j_{sem}(x, \ell)\right).$$

The module then solves a discrete Dirichlet problem to find coordinates that are harmonic with respect to the landmark coordinates, effectively interpolating the new point's position based on its semantic relationships to known landmarks. This process has a closed-form solution as a weighted barycenter, enabling constant-time attachment of new points regardless of the total number of experiences processed. The harmonic extension provides a principled first approximation for the manifold embedding of incoming data.

While harmonic extension provides rapid initial placement, a compression flow engine 250 refines these coordinates to ensure local geometric coherence and global manifold quality. This module implements a constrained gradient flow driven by a geometric energy functional that balances multiple objectives: semantic coherence that keeps semantically related points close on the manifold; curvature regularization that prevents excessive folding or stretching of the manifold; density management that avoids both overcrowding and sparse regions; and chart conditioning that maintains well-behaved local coordinate systems. The flow evolves manifold coordinates through small steps projected onto estimated tangent spaces, ensuring that updates remain on the manifold and preserve its topological structure. The compression flow engine 250 operates locally, updating only neighborhoods affected by new data, which maintains the logarithmic scaling property of the overall system.

Critical to the stability and reliability of the projection is a drift monitor 260, which continuously tracks geometric invariants and triggers adaptive responses when necessary. Drift monitor 260 computes and monitors several key metrics including, but not limited to: principal angles between successive spectral bases to detect when the landmark geometry has shifted significantly; spectral gap ratios to ensure adequate separation between the retained and discarded dimensions; curvature distributions to prevent pathological manifold geometries; injectivity radii to maintain local homeomorphism; and residual statistics from harmonic extension to identify regions requiring new landmarks. When any monitored invariant exceeds predetermined thresholds, drift monitor 260 signals the appropriate module, such as triggering landmark manager 220 to refresh landmarks or prompting diffusion geometry module 230 to update spectral coordinates. This monitoring system provides objective, geometrically-grounded criteria for adaptation, avoiding the ad hoc heuristics common in neural network-based projectors.

Supporting the computational modules are three storage components optimized for GPU-resident operation. The landmark store 270 maintains the current landmark set and associated metadata in high-bandwidth memory, enabling rapid nearest-neighbor queries and kernel computations. The manifold store 280 holds the coordinates of all active points on the manifold M, organized for efficient neighborhood queries and updates during compression flow. Specifically, manifold store 280 incorporates a nearest neighbor index structure such as a k-d tree, ball tree, or HNSW graph that supports constant-time local neighborhood identification. This index is incrementally maintained as new points are projected, with updates affecting only local graph or tree structures rather than requiring global reorganization. The spectral cache 285 stores the eigenvectors and eigenvalues from the diffusion geometry module, supporting both the harmonic extension of new points and the monitoring of spectral drift. These storage components are designed to minimize memory transfers and maximize parallelism in GPU execution while supporting the local update patterns essential to streaming operation.

The data flow through AGD projector 210 follows a carefully orchestrated pipeline, according to an embodiment. Input streams from multiple cortices enter through multimodal interface 290, which routes them to harmonic extension module 240 for initial coordinate assignment. The harmonic extension module queries landmark store 270 via landmark manager 220 and utilizes spectral coordinates from diffusion geometry module 230. Initial coordinates then pass to compression flow engine 250 for refinement, with the final manifold points stored in manifold store 280. Throughout this pipeline, drift monitor 260 observes all operations and maintains statistics, triggering refresh signals to landmark manager 220 when adaptation is necessary. This creates a self-regulating system that maintains geometric coherence without external intervention.

The architecture of AGD projector 210 embodies several design principles that distinguish it from conventional projection methods. First, the separation of global structure (captured by landmark spectral geometry) from local attachment (via harmonic extension) and refinement (through compression flow) enables efficient streaming operation. Second, the use of explicit geometric operations rather than learned parameters provides transparency and theoretical guarantees about projection quality. Third, the comprehensive monitoring system ensures that the projector adapts to changing conditions based on objective mathematical criteria rather than heuristic loss functions. These principles combine to create a projection system that is simultaneously adaptive, reliable, and computationally efficient, meeting the demanding requirements of persistent cognitive architectures that must operate over extended time horizons with diverse and evolving inputs.

Figure 3:
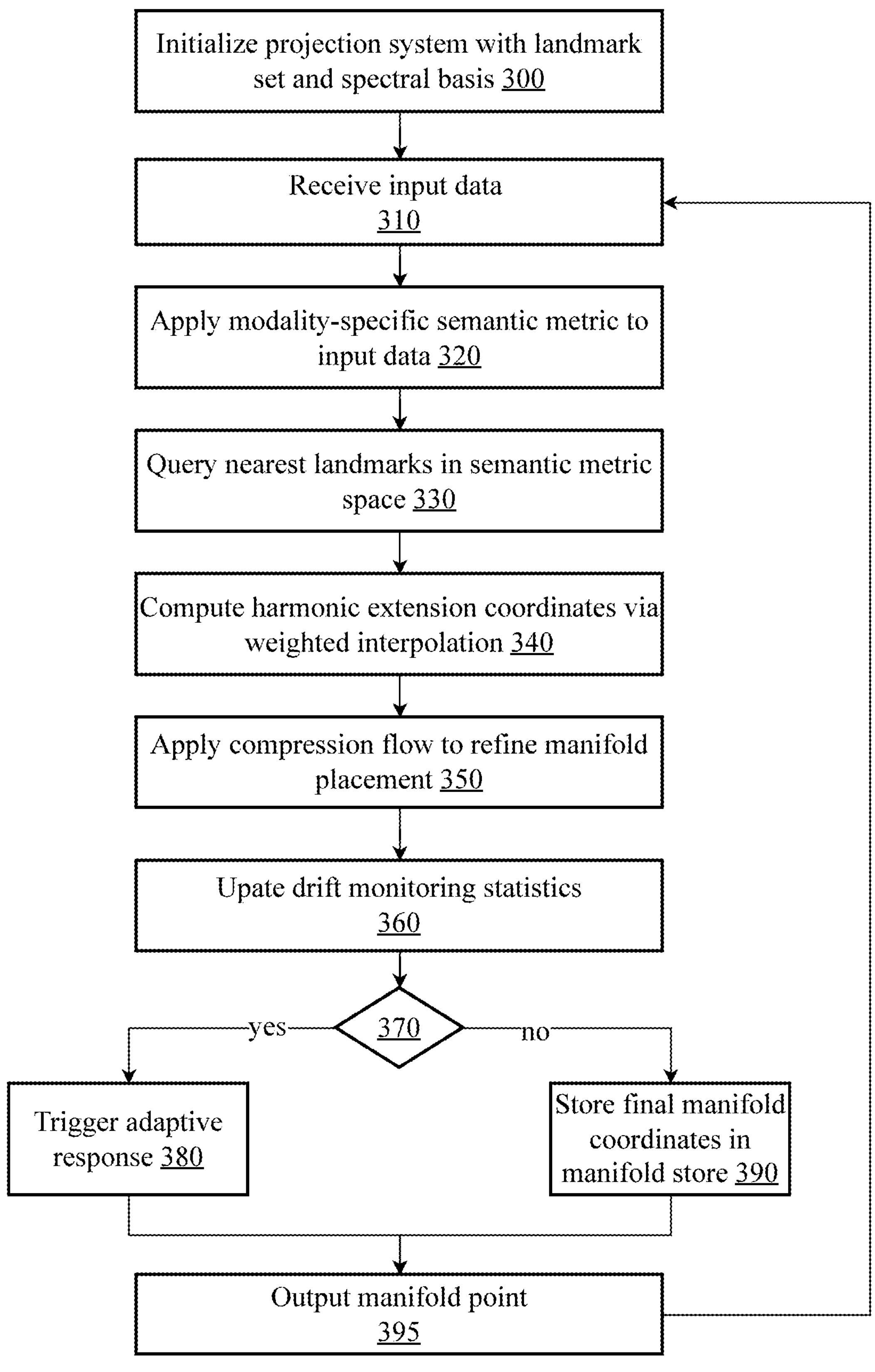
FIG. 3 is a flow diagram illustrating an exemplary method for adaptive geometric diffusion projection onto manifolds, according to an embodiment.

FIG. 3 is a flow diagram illustrating an exemplary method for adaptive geometric diffusion projection onto manifolds, according to an embodiment. The method 300 implements an operational pipeline of the adaptive geometric diffusion system, demonstrating how heterogeneous, high-dimensional inputs are transformed into coherent manifold coordinates while maintaining geometric stability through continuous monitoring and adaptation. Unlike conventional projection methods that operate in batch mode with periodic retraining, method 300 implements a streaming architecture with inline geometric validation, enabling continuous operation over indefinite time horizons without degradation.

According to the embodiment, the process begins at step 300 when the projection system initializes with a landmark set and spectral basis. This initialization process establishes the foundational geometric structure upon which all subsequent projections will be based. The initialization may comprise selecting an initial set of landmarks L from available data or prior knowledge, constructing a semantic kernel that captures relationships among landmarks, computing the graph Laplacian and its spectral decomposition to obtain eigenvalues and eigenvectors, and establishing the canonical coordinate system based on the top m eigenvectors selected by spectral gap analysis. For systems that are restarting rather than initializing fresh, this step may involve loading previously computed spectral bases and landmark sets from persistent storage, enabling continuity across system restarts.

In a step 310, the system receives input data from a cortex j, which produces a latent representation in the space $S^j$. This input may arrive as part of a continuous stream from one or more cortices operating in parallel, each generating representations with distinct dimensional and distributional characteristics. The receiving process extracts both the raw latent vector and any associated metadata that may inform the projection, such as the cortex identifier, timestamp, confidence measures, or semantic tags. The system maintains input buffers that can accommodate varying arrival rates from different cortices, ensuring that the projection pipeline can process heterogeneous streams without blocking or dropping data.

In a step 320, the system applies a modality-specific semantic metric to the input data. Each cortex type j has an associated semantic metric that captures the appropriate notion of similarity for that modality. For visual cortices, this metric may emphasize perceptual similarity based on learned features or handcrafted descriptors. For language cortices, the metric may incorporate syntactic structure, semantic relationships, or contextual embeddings. For temporal cortices, the metric may weight recent proximity more heavily than distant relationships. The application of these modality-specific metrics ensures that the subsequent landmark queries retrieve genuinely relevant reference points rather than spurious matches based on incidental coordinate proximity.

In a step 330, the system queries the L nearest landmarks in the semantic metric space. This query operation leverages efficient approximate nearest neighbor data structures such as hierarchical navigable small world graphs or inverted file indices that have been pre-built on the landmark set. The parameter L can be selected to balance computational efficiency with interpolation quality, typically ranging from 5 to 20 landmarks depending on the manifold's local complexity. The query returns not only the landmark identities but also their distances in the semantic metric, which will be used for weight computation in the subsequent interpolation step. This nearest neighbor query represents one of the few potentially costly operations in the pipeline, but its complexity remains logarithmic in the landmark set size, which itself is much smaller than the full manifold.

In a step 340, the system computes harmonic extension coordinates via weighted interpolation. Using the landmarks identified in the previous step and their semantic distances, the system calculates interpolation weights according to an exponential kernel with a modality-specific bandwidth parameter. These weights can be normalized to sum to unity, and the harmonic extension coordinates may be computed as the weighted barycenter of the landmark spectral coordinates. This computation has a closed-form solution requiring only vector operations, making it extremely efficient. The result is an initial placement in the manifold coordinate system that respects the semantic relationships to known landmarks while maintaining the smooth structure imposed by the spectral basis.

In a step 350, the system applies compression flow to refine the manifold placement. While harmonic extension provides a reasonable initial placement, local geometric inconsistencies may accumulate without correction. The compression flow implements a gradient descent on a geometric energy functional that balances semantic coherence, manifold curvature, local density, and coordinate chart conditioning. The flow operates in small steps projected onto the local tangent space to ensure that updates remain on the manifold. Typically, only one or two iterations are required to achieve satisfactory local geometry. The compression flow affects only the neighborhood of the new point, maintaining reduced processing complexity of the insertion operation. This local refinement ensures that the manifold maintains its geometric quality even after millions of insertions.

In a step 360, the system updates drift monitoring statistics. Throughout the projection pipeline, various geometric invariants and quality metrics are computed and tracked. These include, but are not limited to, residuals from the harmonic extension indicating how well the new point fits the existing landmark structure, local curvature estimates in the neighborhood of the new point, density measures to detect overcrowding or sparsity, principal angles between the current and previous spectral bases if refreshed, and spectral gap ratios indicating the stability of the dimensionality reduction. These statistics are maintained using streaming algorithms that require minimal memory while providing accurate estimates of distribution properties. The drift monitor aggregates these statistics to build a comprehensive picture of the manifold's health and the projection quality over time.

At decision point 370, the system evaluates whether any drift threshold has been exceeded. The drift monitor compares current statistics against predetermined thresholds that indicate when adaptation is necessary. These thresholds may be set conservatively to balance stability with responsiveness, typically triggering adaptation only when geometric invariants show significant degradation or when projection quality metrics indicate systematic errors. The thresholds may be adaptive themselves, tightening in regions of high confidence and relaxing when exploring novel areas of the latent space. If no threshold is exceeded, the system proceeds directly to storage; otherwise, it branches to the adaptive response subroutine.

In a step 380, when drift is detected, the system triggers an adaptive response appropriate to the type of drift observed. An adaptive response subroutine may begin with a decision, which categorizes the drift type based on which metrics exceeded thresholds. For spectral drift indicated by large principal angles, the system proceeds to perform a warm-started refresh of the spectral basis, using the previous eigenvectors as initial conditions for accelerated convergence. For coverage gaps indicated by high harmonic extension residuals, the projection system promotes new landmarks from recent high-residual points to improve representation in under-covered regions. For geometric degradation indicated by curvature or density violations, the projection system adjusts the parameters of the compression flow to restore geometric quality. Each adaptive response is designed to address specific failure modes while minimizing disruption to the overall projection pipeline.

The system updates relevant components based on the adaptive response. This may comprise broadcasting new spectral coordinates to all storage components, updating the nearest neighbor indices with new landmarks, or propagating adjusted parameters to the compression flow engine. The updates are designed to be incremental and local when possible, avoiding global recomputation that would violate the streaming complexity bounds.

In a step 390, the system stores the final manifold coordinates in the manifold store. The storage operation includes not only the m-dimensional coordinate vector but also associated metadata such as the originating cortex identifier, timestamp, semantic tags, and quality metrics. The manifold store is organized to support efficient neighborhood queries for future compression flow operations and maintains appropriate indexing structures for retrieval. The storage operation also triggers any necessary updates to dependent data structures, such as spatial indices or density estimators.

In a step 395, the system outputs the manifold point $m \in M$, making it available to downstream components such as the thought cache in a PCM architecture or other cognitive processing modules. The output includes the coordinate representation that can be used for similarity computations, trajectory planning, or other geometric operations on the manifold. After output, the method returns to step 310 to process the next input, creating a continuous streaming loop that can operate indefinitely while maintaining projection quality through adaptive responses to drift.

By combining efficient harmonic extension with local compression flow and continuous drift monitoring, the method enables robust projection that maintains semantic coherence even under challenging conditions of heterogeneous, non-stationary input streams.

Figure 4:
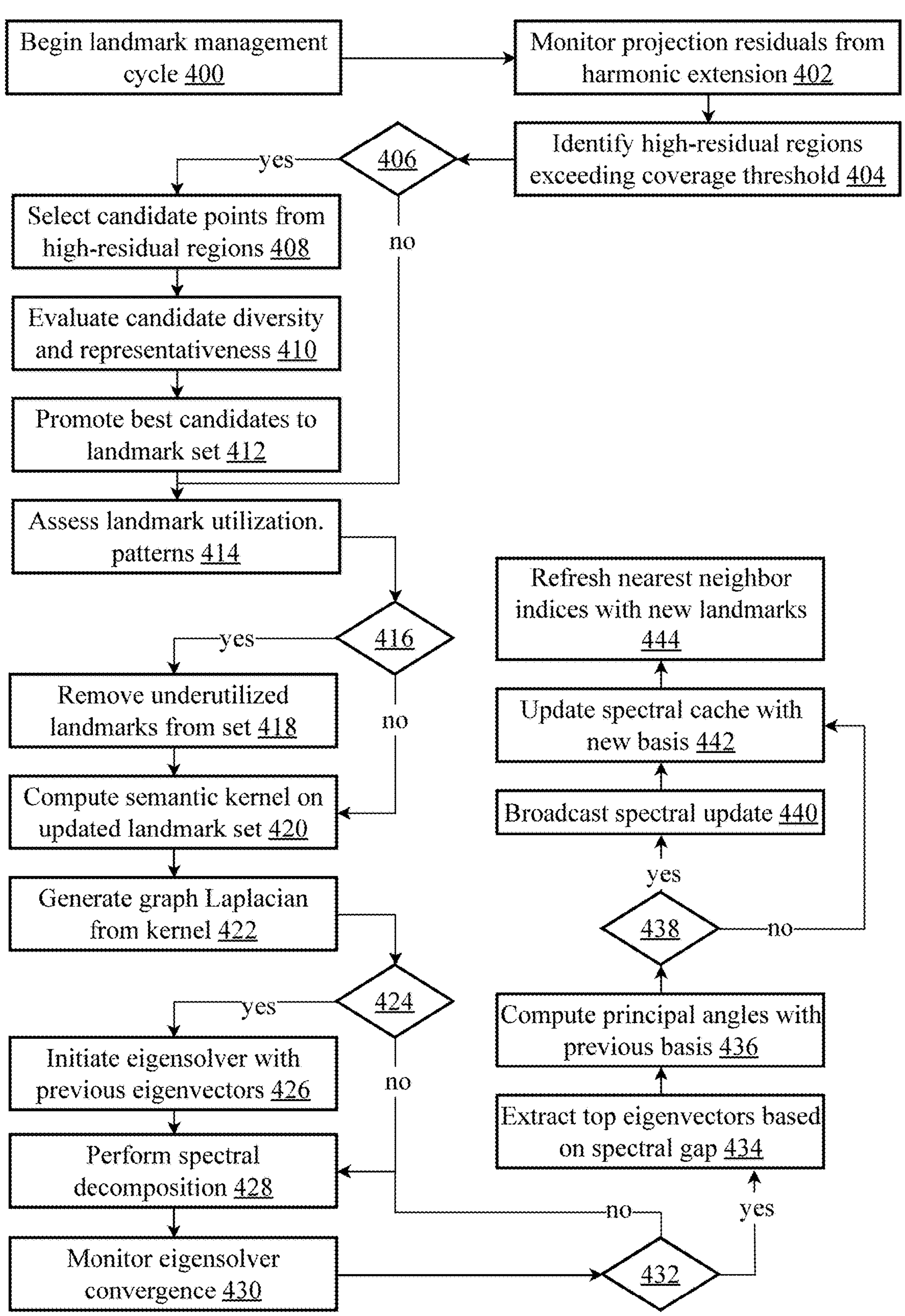
FIG. 4 is a flow diagram illustrating an exemplary method for landmark management and spectral update within the adaptive geometric diffusion system, according to an embodiment

FIG. 4 is a flow diagram illustrating an exemplary method for landmark management and spectral update within the adaptive geometric diffusion system, according to an embodiment. The method 400 represents an adaptive maintenance procedure that updates the landmark set based on coverage analysis and refreshes the spectral basis to reflect these changes. This design ensures that spectral computations always operate on the most current landmark configuration, maintaining consistency between the landmark infrastructure and its spectral representation. Unlike static landmark selection methods that require periodic global recomputation, method 400 implements continuous monitoring with incremental updates, maintaining projection quality without disrupting ongoing operations.

According to the embodiment, the process begins at step 400 when the system begins a landmark management cycle. These cycles may be triggered either periodically based on elapsed time or data volume, or reactively when drift monitoring indicates potential coverage or quality issues. The landmark management cycle operates concurrently with the main projection pipeline, ensuring that projection operations can continue uninterrupted while the landmark infrastructure adapts to changing conditions. The cycle maintains state across iterations, tracking historical patterns of landmark utilization, residual distributions, and spectral stability to inform current decisions.

In a step 402, the system monitors projection residuals from harmonic extension operations. During normal projection operations, each harmonic extension produces a residual that indicates how well the new point can be represented by interpolation from existing landmarks. These residuals are aggregated using streaming statistical methods that maintain distributional information without storing individual values. The monitoring process tracks several residual statistics including the mean and variance of residuals across different time windows, quantile estimates particularly focusing on the tail behavior, spatial clustering of high residuals that may indicate systematic coverage gaps, and temporal trends showing whether residuals are increasing or decreasing. This continuous monitoring provides the primary signal for detecting when the landmark set requires adaptation.

In a step 404, the system identifies high-residual regions that exceed a coverage threshold. The identification process may utilize spatial hashing or clustering algorithms to group residuals by their location in the latent space, identifying contiguous regions where projection quality is consistently poor. The coverage threshold is set adaptively based on the global residual distribution, typically targeting a range (e.g., the top 1-5%) of residuals as candidates for improved coverage. Regions may be characterized not only by their residual magnitude but also by their persistence over time and the number of points affected, ensuring that landmark additions address systematic coverage gaps rather than isolated outliers.

At decision point 406, the system evaluates whether significant coverage gaps have been detected. This decision may consider both the absolute magnitude of residuals in identified regions and their impact on overall projection quality. If the high-residual regions affect a substantial number of recent projections or show persistent degradation over multiple cycles, the system proceeds to landmark promotion. Otherwise, it skips to landmark utilization assessment, avoiding unnecessary expansion of the landmark set.

In a step 408, when coverage gaps are confirmed, the system selects candidate points from high-residual regions. The selection process can be configured to balance several criteria to identify points that will effectively improve coverage, some examples of which include: centrality within the high-residual region to maximize coverage improvement, stability over time to avoid selecting transient outliers, diversity relative to existing landmarks to avoid redundancy, and representativeness of the local data distribution. The system typically selects multiple candidates per region, allowing subsequent evaluation to choose the most effective additions. Candidates are drawn from recent projection history, ensuring they reflect current distribution patterns rather than historical artifacts.

In a step 410, the system evaluates candidate diversity and representativeness. This evaluation prevents the landmark set from becoming unnecessarily large or redundant by ensuring each new landmark provides meaningful coverage improvement. The evaluation computes pairwise distances between candidates and existing landmarks in the semantic metric, estimates the coverage improvement each candidate would provide using a leave-one-out prediction approach, and assesses the stability of candidates by examining their neighborhood consistency over time. Candidates that are too similar to existing landmarks or each other are filtered out, while those providing maximal coverage improvement with minimal redundancy are retained.

In a step 412, the system promotes the best candidates to the landmark set L. The promotion process involves adding selected candidates to the active landmark set, computing their semantic relationships to existing landmarks for kernel construction, and updating auxiliary data structures that depend on the landmark set. The number of promotions in each cycle is bounded to prevent sudden expansions that could destabilize the spectral basis. Typically, the system promotes between 1% and 5% new landmarks per cycle when coverage gaps are detected, balancing improved coverage against computational costs.

In a step 414, the system assesses landmark utilization patterns to identify potential redundancy. Each landmark maintains utilization statistics tracking how often it appears among the nearest neighbors during harmonic extension, with what average weight it contributes to interpolations, and whether its removal would significantly impact projection quality. These statistics are maintained using exponential decay to emphasize recent patterns while retaining historical information. Landmarks that consistently show low utilization may be candidates for removal, helping to maintain a compact and efficient landmark set.

At decision point 416, the system determines whether underutilized landmarks are present. A landmark is considered underutilized if its utilization metrics fall below adaptive thresholds for an extended period. The decision considers not only current utilization but also historical importance and potential future relevance. Landmarks in sparse regions may show low utilization but remain important for coverage, while landmarks in dense regions with many alternatives may be safely removed. If underutilized landmarks are identified and their removal would not create coverage gaps, the system proceeds to landmark removal.

In a step 418, the system removes underutilized landmarks from set L. The removal process is conservative, ensuring that coverage quality is maintained. Before removal, the system verifies that neighboring landmarks can adequately cover the removed landmark's region and that no recent high-residual points would be affected by the removal. The removal is staged, with landmarks marked for removal but retained for one additional cycle to verify that their absence does not degrade projection quality. This conservative approach prevents oscillation between addition and removal of landmarks in boundary regions.

In a step 420, following any landmark set modifications, the system computes the semantic kernel K on the updated landmark set. According to an embodiment, the kernel construction uses the composite formula $K(\ell, \ell')=\exp(-\Sigma_j \alpha_j d^j_{sem}(\ell, \ell'))$, combining semantic distances across all modalities with appropriate weights. For efficiency, only kernel entries affected by landmark additions or removals may be recomputed, leveraging the sparsity of updates. The kernel may be further sparsified by thresholding small values, reducing computational costs for subsequent operations while maintaining the essential connectivity structure.

In a step 422, the system generates the graph Laplacian $L_L$ from the updated kernel. According to an embodiment, the Laplacian construction follows the normalized form $L_L=I-D^{-1/2}KD^{-1/2}$, where D is the degree matrix. For incremental updates, the system can efficiently update the Laplacian by modifying only rows and columns corresponding to changed landmarks, avoiding full recomputation. The Laplacian is stored in a sparse format optimized for the subsequent eigenvalue computations.

At decision point 424, the system checks whether a previous spectral basis is available for warm-starting. In most operational cycles, a previous basis exists from earlier computations. This basis provides excellent initial conditions for iterative eigensolvers, dramatically reducing the number of iterations required for convergence. Only during initial system startup or after catastrophic changes would no previous basis be available, requiring cold-start initialization.

In a step 426, when available, the system initializes the eigensolver with previous eigenvectors. The warm-start procedure projects the previous eigenvectors onto the space of the updated Laplacian and orthonormalizes them to provide initial iterates. Because landmark changes are typically small relative to the total landmark set, these projected vectors are usually close to the true eigenvectors of the updated Laplacian. This warm-starting can reduce iteration counts by an order of magnitude compared to random initialization.

In a step 428, the system performs spectral decomposition via an iterative eigensolver. The solver, typically (but not necessarily) a Lanczos or locally optimal block preconditioned conjugate gradient (LOBPCG) method, computes the top r eigenvalue-eigenvector pairs of the Laplacian. The iteration leverages the sparse structure of the Laplacian and the warm-start initialization to achieve rapid convergence. The solver maintains numerical stability through periodic reorthogonalization and uses adaptive tolerance based on the spectral gap to avoid over-solving.

In a step 430, the system monitors eigensolver convergence through residual norms and eigenvalue stability. Convergence criteria include both absolute tolerance on the eigenvalue residuals and relative tolerance based on the spectral gap. The monitoring also tracks the number of iterations to detect potential conditioning issues that might require solver parameter adjustments.

At decision point 432, the system evaluates whether the eigensolver has converged to the specified tolerance. If convergence is not achieved within a maximum iteration budget, the solver parameters may be adjusted or the tolerance relaxed to ensure bounded computation time. However, warm-starting typically ensures rapid convergence except in cases of dramatic landmark changes.

In a step 434, the system extracts the top m eigenvectors based on spectral gap analysis. The selection of m is guided by identifying a significant gap in the eigenvalue spectrum, where $\lambda_m+1-\lambda_m$ is large relative to adjacent gaps. This gap indicates a natural dimensional boundary in the data structure. The selected eigenvectors form the columns of the spectral coordinate matrix $\Psi_c$ used for harmonic extension.

In a step 436, the system computes principal angles between the new and previous spectral bases. These angles, obtained through singular value decomposition of the basis inner products, quantify how much the spectral coordinates have rotated due to landmark updates. Small principal angles indicate stability, while large angles suggest significant structural changes in the data distribution that may require system-wide coordinate updates.

At decision point 438, the system evaluates whether any principal angle exceeds a stability threshold. For instance, typical thresholds may range from 5 to 15 degrees, balancing stability with adaptability. If all angles remain small, the spectral update can be considered a minor refinement that does not require global propagation. Large angles indicate a significant change that must be communicated throughout the system.

In a step 440, when significant spectral changes occur, the system broadcasts updates to all components. This broadcast includes the new spectral basis $\Psi_c$, updated eigenvalues for gap monitoring, rotation matrices for transforming old coordinates if needed, and timestamp information for consistency management. The broadcast ensures that all system components operate with consistent spectral coordinates, preventing discrepancies that could degrade projection quality.

In a step 442, the system updates the spectral cache with the new basis. The cache storage includes not only the current basis but also recent historical bases to support warm-starting and stability analysis. The cache implementation optimizes for rapid access during harmonic extension operations while maintaining the full precision necessary for numerical stability.

In a step 444, the system refreshes nearest neighbor indices with new landmarks. The index structures, such as HNSW graphs or IVF indices, must incorporate new landmarks and remove deleted ones while maintaining query performance. Incremental index updates leverage the local nature of most changes, modifying only affected neighborhoods rather than rebuilding globally.

Upon conclusion, the system returns to the main projection pipeline, having successfully adapted the landmark infrastructure to current conditions. The return includes updated handles and version information to ensure consistency. The entire landmark management and spectral update process is designed to operate concurrently with ongoing projections, providing seamless adaptation without service interruption.

Figure 5:
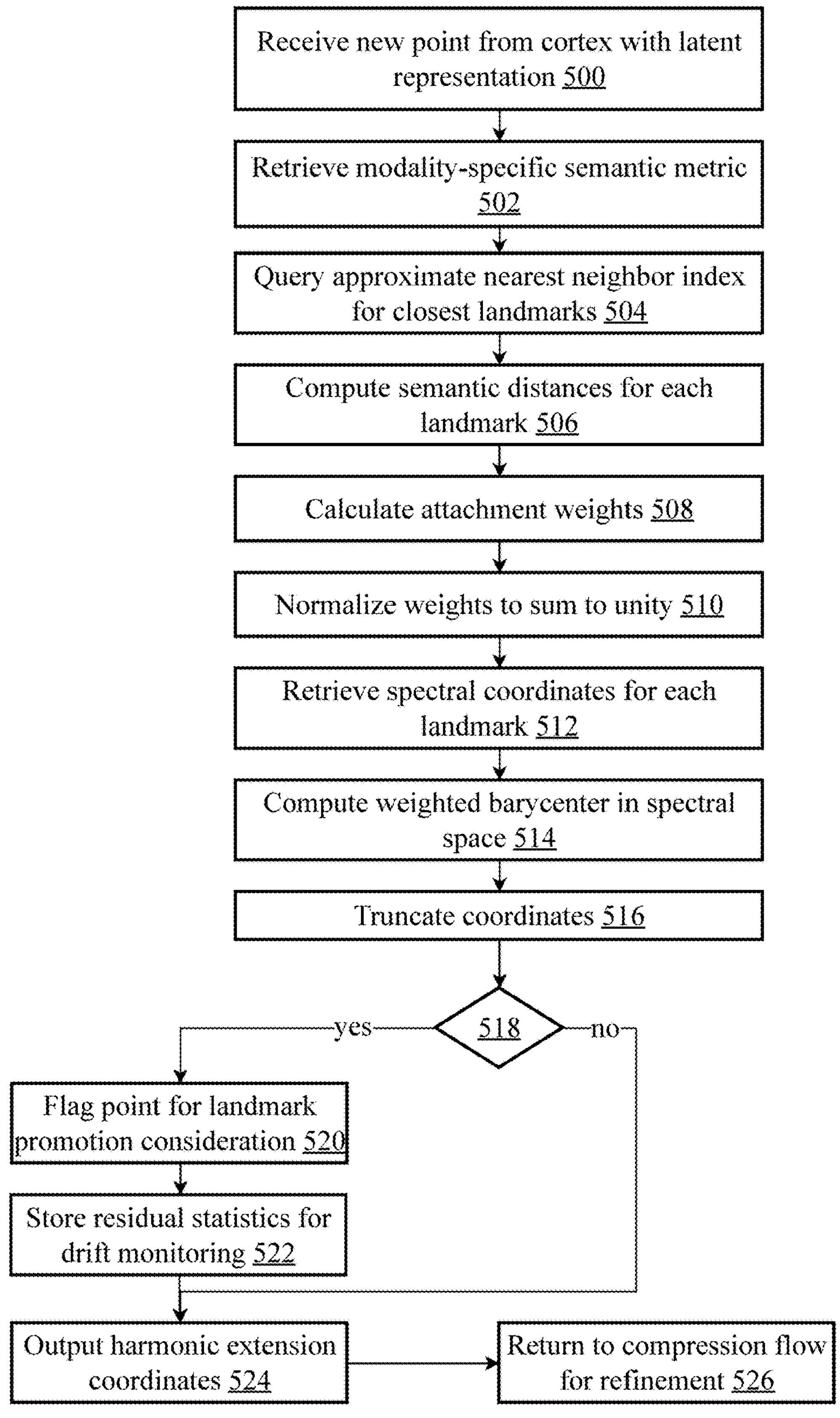
FIG. 5 is a flow diagram illustrating an exemplary method for harmonic extension enabling streaming attachment of new points to the manifold, according to an embodiment.

FIG. 5 is a flow diagram illustrating an exemplary method for harmonic extension enabling streaming attachment of new points to the manifold, according to an embodiment. The method 500 provides a mechanism by which the adaptive geometric diffusion system enables constant-time projection of new data points without requiring global recomputation or access to the full dataset. This harmonic extension process realizes a discrete Dirichlet problem, where new points are assigned coordinates that are harmonic with respect to the boundary conditions imposed by nearby landmarks. Unlike traditional manifold learning methods that require batch processing or iterative optimization, method 500 provides a closed-form solution that enables true streaming operation with bounded computational complexity.

According to the embodiment, the process begins at step 500 when the system receives a new point x from cortex j, where the point is represented as a high-dimensional vector in the latent space $S^j$. This input may arrive as part of a continuous stream from an active cortex, representing anything from visual features extracted by a convolutional network to semantic embeddings from a language model to temporal patterns from a sequence processor. The receiving process extracts not only the raw latent vector but also metadata identifying the source cortex, which is essential for applying the appropriate modality-specific processing in subsequent steps. The system maintains separate input channels for each cortex type, allowing parallel processing of heterogeneous streams while preserving modality-specific characteristics.

In a step 502, the system retrieves the modality-specific semantic metric associated with cortex j. Each cortex type has a carefully designed semantic metric that captures the appropriate notion of similarity for that modality. For a visual cortex, the metric might emphasize perceptual similarity based on color, texture, and shape features. For a language cortex, the metric might incorporate semantic relatedness, syntactic similarity, or contextual proximity. For a temporal cortex, the metric might weight recent observations more heavily than distant ones. These metrics are not simply Euclidean distances in the latent space but rather learned or designed dissimilarity functions that respect the semantic structure of each modality. The retrieval process accesses pre-computed metric parameters and function pointers optimized for efficient evaluation.

In a step 504, the system queries an approximate nearest neighbor (ANN) index to find the L closest landmarks to point x in the semantic metric space. The ANN index, which may be implemented as a hierarchical navigable small world (HNSW) graph or an inverted file (IVF) structure, has been pre-built on the landmark set and optimized for the specific semantic metric of each modality. The query process navigates the index structure to rapidly identify candidate landmarks without exhaustive comparison. The parameter L is chosen to balance interpolation quality with computational efficiency, typically (but not necessarily) set between 10 and 20 landmarks. This bounded neighborhood size ensures that the subsequent interpolation remains local and computationally tractable.

In a step 506, the system computes the exact semantic distances between the new point and each of the L retrieved landmarks. While the ANN index provides rapid approximate retrieval, the exact distances are needed for accurate weight computation. These distance calculations may involve complex operations depending on the semantic metric—for instance, computing optimal transport distances for distribution-valued representations or evaluating learned neural distance functions. The system leverages vectorized implementations and GPU parallelism where available to compute all L distances efficiently. The computed distances serve dual purposes: they determine interpolation weights for coordinate assignment and provide signals for coverage quality assessment.

In a step 508, the system calculates attachment weights using an exponential kernel for a modality-specific bandwidth parameter. The exponential kernel provides smooth decay with distance, ensuring that nearby landmarks contribute strongly to the interpolation while distant landmarks have negligible influence. The bandwidth parameter $\kappa_j$ is tuned for each modality to reflect the typical scale of semantic variations, tighter bandwidths for modalities with fine-grained distinctions, looser bandwidths for modalities with coarser semantic structure. These parameters may be adapted over time based on observed distance distributions, maintaining appropriate localization as the data distribution evolves. The exponential form also ensures numerical stability and provides theoretical guarantees about the smoothness of the resulting interpolation.

In a step 510, the system normalizes the weights to sum to unity, converting the raw exponential values into proper convex combination coefficients. This normalization ensures that the subsequent barycentric coordinates lie within the convex hull of the landmark coordinates, preventing extrapolation artifacts that could place new points in poorly-charted regions of the manifold. The normalization is computed with care taken to handle numerical edge cases such as when all distances are large (resulting in near-zero weights) or when one distance is much smaller than others (resulting in near-singular weight concentration). The normalized weights represent the influence each landmark has on the final coordinate assignment.

In a step 512, the system retrieves the spectral coordinates $\Psi_c(\ell)$ for each of the L landmarks involved in the interpolation. These coordinates have been pre-computed during the spectral decomposition phase and stored in the spectral cache for rapid access. Each landmark's coordinates consist of its values along the top m eigenvectors of the landmark graph Laplacian, providing its position in the canonical spectral embedding. The retrieval process is optimized for cache locality, as landmarks that are semantically close are likely to be accessed together repeatedly. The spectral coordinates represent the "boundary conditions" for the harmonic extension problem; the new point's coordinates must interpolate smoothly between these known positions.

In a step 514, the system computes the weighted barycenter in spectral space. This barycentric interpolation has a deep mathematical justification: it solves the discrete Dirichlet problem of finding coordinates that are harmonic (have zero Laplacian) on the new vertex while matching the landmark coordinates on the boundary. The computation is straightforward matrix-vector multiplication, with the normalized weights forming the coefficients and the landmark coordinates forming the columns. The result is a coordinate vector in the full r-dimensional spectral space that smoothly interpolates between the landmark positions based on semantic proximity. This closed-form solution avoids the iterative optimization required by many manifold learning methods.

In a step 516, the system truncates the coordinates to the first m dimensions, where m has been selected based on spectral gap analysis. While the full spectral decomposition may compute r>m eigenvectors for numerical stability and future flexibility, only the first m coordinates are retained for the final manifold representation. This truncation respects the natural dimensional boundary identified by the spectral gap, discarding coordinates along eigenvectors associated with small eigenvalues that primarily encode noise or fine-grained variations. The truncated coordinates $\Psi(x)\in R^m$ represent the new point's position on the semantic manifold M.

At decision point 518, the system evaluates whether the extension residual exceeds a quality threshold. The residual measures how well the new point can be represented by interpolation from the available landmarks wherein high residuals indicate that the point lies in a region poorly covered by the current landmark set. The residual computation may involve comparing the reconstructed spectral coordinates against an independent embedding or evaluating the smoothness of the interpolation weights. The threshold is set adaptively based on the global distribution of residuals, typically targeting a range (e.g., the top 1-5%) as indicators of coverage gaps. This evaluation provides critical feedback for the adaptive maintenance of the landmark set.

In a step 520, when the residual exceeds the threshold, the system flags the point for landmark promotion consideration. This flagging does not immediately promote the point to landmark status but rather adds it to a buffer of promotion candidates that will be evaluated during the next landmark management cycle. The flagging includes storing the point's coordinates, its residual value, and temporal information to track whether high residuals persist in this region over time. Points that consistently show high residuals across multiple observations are strong candidates for promotion, as they indicate systematic coverage gaps rather than isolated outliers.

In a step 522, the system stores residual statistics for drift monitoring, regardless of whether the individual residual exceeded the threshold. These statistics are maintained using streaming algorithms that update running estimates of mean, variance, quantiles, and other distributional properties without storing individual values. The statistics are segmented by modality and time window to detect both global drift and modality-specific changes. This continuous monitoring provides the signals necessary for adaptive system maintenance, triggering landmark updates or parameter adjustments when the statistical properties shift significantly.

In a step 524, the system outputs the harmonic extension coordinates $\Psi(x)$, which represent the new point's position on the semantic manifold M. These coordinates are now ready for potential refinement by the compression flow engine and eventual storage in the manifold store. The output includes not only the m-dimensional coordinate vector but also metadata such as the interpolation weights (for potential reverse mapping), the extension residual (for quality tracking), and the landmark identities (for understanding the local manifold structure). These coordinates maintain the semantic relationships from the original high-dimensional space while providing a compact, geometrically coherent representation.

In a step 526, the system returns control to the compression flow engine for potential coordinate refinement. While harmonic extension provides a principled initial placement, local geometric optimization may improve the manifold quality by adjusting positions to better satisfy curvature, density, and smoothness constraints. The handoff includes all necessary context for the compression flow to operate efficiently on the local neighborhood of the new point. This modular design allows the harmonic extension to focus on rapid, streaming attachment while delegating fine-grained geometric optimization to specialized components.

By combining efficient approximate nearest neighbor search with weighted barycentric interpolation in spectral space, this method enables streaming attachment that is simultaneously fast, accurate, and theoretically grounded. The method's ability to process millions of points while maintaining consistent quality through residual monitoring and adaptive landmark promotion makes it uniquely suited for the demands of persistent cognitive architectures operating over indefinite time horizons.

Figure 6:
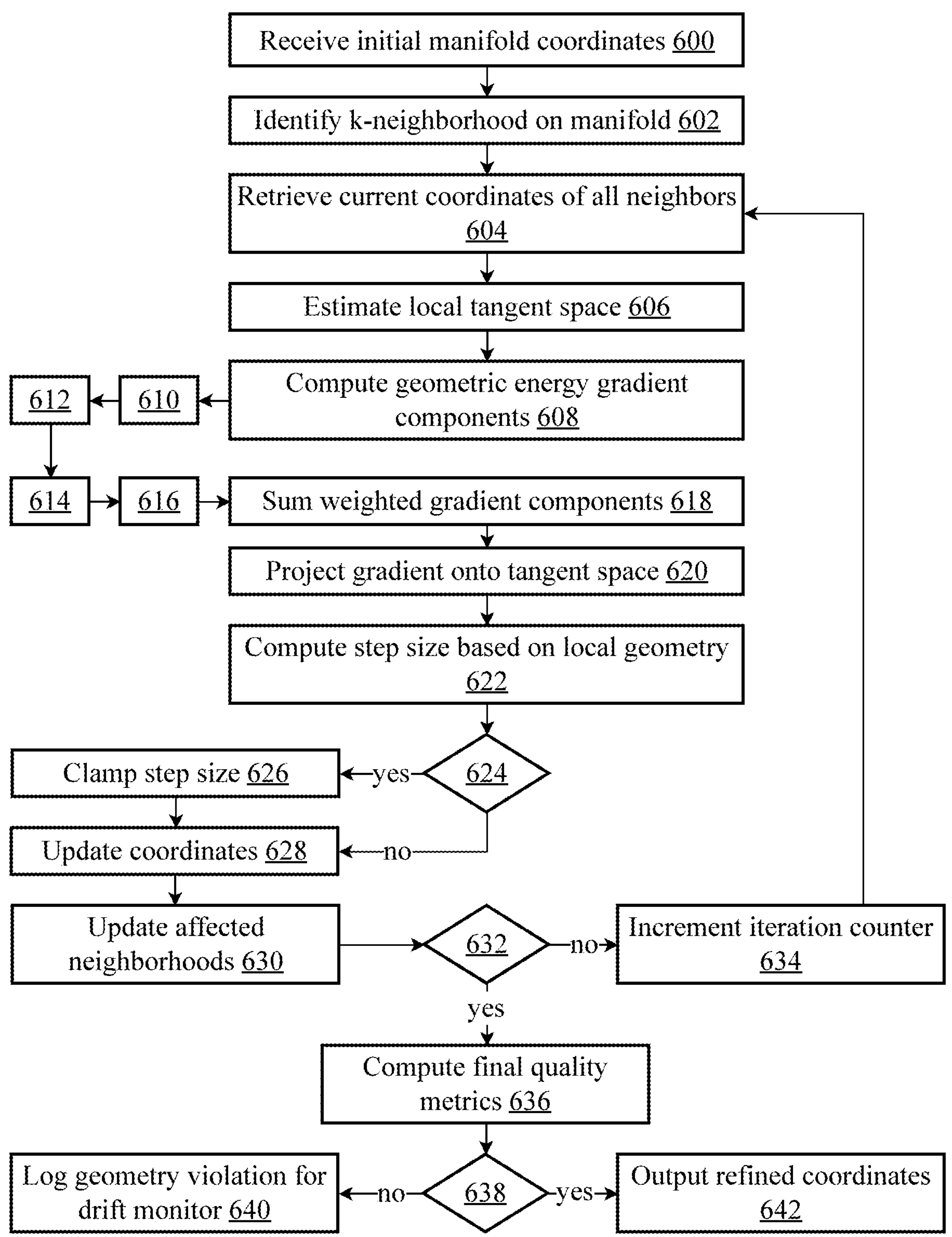
FIG. 6 is a flow diagram illustrating an exemplary method for compression flow refinement of manifold coordinates, according to an embodiment.

FIG. 6 is a flow diagram illustrating an exemplary method for compression flow refinement of manifold coordinates, according to an embodiment. The method represents a constrained geometric optimization process that refines the initial placement provided by harmonic extension to ensure local geometric coherence and global manifold quality. Unlike traditional manifold learning methods that perform global optimization or rely on fixed embedding algorithms, this method implements a local, adaptive flow that preserves the streaming nature of the projection while enforcing geometric constraints through explicit energy terms. This compression flow operates only on affected neighborhoods.

According to the embodiment, the process begins at step 600 when the system receives initial manifold coordinates from the harmonic extension module. These coordinates represent a first approximation of the new point's position on the manifold, obtained through weighted interpolation from nearby landmarks. While harmonic extension ensures smooth interpolation and respects the global spectral structure, it may not optimize for local geometric properties such as uniform density, bounded curvature, or well-conditioned coordinate charts. The compression flow refines these coordinates through a principled gradient flow that balances multiple geometric objectives while remaining constrained to the manifold. The initial coordinates serve as the starting point for this iterative refinement process.

In a step 602, the system identifies the k-neighborhood N(x) of the new point on the manifold. This neighborhood consists of the k nearest points in the current manifold representation, found through efficient spatial data structures such as k-d trees or ball trees built on the manifold coordinates. The neighborhood size k is chosen to capture sufficient local structure for meaningful geometric computation while remaining small enough to ensure efficient processing, typically (but not necessarily) between 10 and 30 neighbors. The neighborhood definition uses geodesic approximation through Euclidean distances in the manifold coordinates, which is accurate for smooth manifolds when neighborhoods are sufficiently small. This local focus is essential to the streaming nature of the algorithm, as it limits the scope of each update to a bounded region.

In a step 604, the system retrieves the current coordinates of all neighbors in N(x). These coordinates may be fetched from the manifold store, which maintains the current positions of all points on the manifold. The retrieval includes not only the coordinate vectors but also associated metadata such as point ages (how long since insertion), modality sources, and any special flags that might affect processing. The system can maintain these coordinates in a local working buffer during the flow iterations to minimize memory access overhead. For new points being inserted simultaneously in parallel threads, appropriate locking or conflict resolution ensures coordinate consistency.

In a step 606, the system estimates the local tangent space $T_x M$ via principal component analysis (PCA) on the neighborhood coordinates. The tangent space approximation is crucial for ensuring that gradient updates remain on the manifold rather than drifting into the ambient space. The PCA computation proceeds by centering the neighbor coordinates around Ψ(x), computing the covariance matrix of the centered coordinates, and extracting the top m eigenvectors that define the local tangent directions. The tangent space estimate becomes more accurate as the manifold sampling density increases. For very sparse regions, the system may use regularized PCA or include additional distant neighbors to ensure stable tangent space estimation. This local linear approximation enables the projection of gradient vectors onto the manifold, maintaining the constraint that updated coordinates remain on M.

In a step 608, the system computes gradient components of the geometric energy functional. The total energy E(Ψ) balances multiple objectives that together encourage a well-formed manifold. Each component addresses a specific geometric concern and can be computed independently before combination. The modular design allows easy adjustment of the energy functional for different applications or manifold characteristics.

In a step 610, the system calculates the semantic coherence term $\nabla E_{sem}$. This gradient component encourages semantically similar points to remain close on the manifold while allowing semantically dissimilar points to separate. The computation involves evaluating pairwise semantic distances $d^{j}_{sem}$ between x and its neighbors, comparing these semantic distances to manifold distances ||Ψ(x)ΨΨ(y)||, and computing gradients that reduce discrepancies between semantic and manifold proximities. The semantic coherence term prevents the manifold from developing arbitrary distortions that would destroy the semantic meaning of geodesics. The gradient is weighted by the reliability of semantic distances, giving more influence to high-confidence similarities.

In a step 612, the system calculates the curvature penalty term $\nabla E_{curv}$. This gradient component discourages excessive local curvature that could lead to manifold folding or create numerical difficulties for downstream processing. The curvature estimation uses the positions and tangent spaces of neighboring points to approximate the second fundamental form. The gradient is computed to flatten regions of high curvature while preserving necessary bends that reflect true semantic boundaries. The system employs a soft penalty that allows moderate curvature but strongly penalizes extreme values that would violate smoothness assumptions. Mean curvature H and Gaussian curvature K may both contribute to this term, with separate weight parameters controlling their relative importance.

In a step 614, the system calculates the density regularization term $\nabla E_{dens}$. This gradient component encourages uniform sampling density across the manifold, preventing both overcrowding and sparse regions. The density estimation uses kernel density estimation on the local neighborhood, with the gradient computed to move points away from high-density regions and toward low-density regions. This regularization serves multiple purposes: it improves the conditioning of local operations, ensures efficient use of the manifold's representational capacity, and prevents the formation of singularities. The target density may be uniform or may follow a prescribed distribution based on importance weights or semantic priorities.

In a step 616, the system calculates the chart conditioning term $\nabla E_{chart}$. This gradient component ensures that local coordinate charts remain well-conditioned, preventing the development of degenerate mappings that would compromise the manifold's differentiable structure. The computation involves evaluating the Jacobian of the local parameterization, computing condition numbers or related metrics of distortion, and generating gradients that improve the local isometry between the manifold and its tangent space. Well-conditioned charts are essential for stable computation of geodesics, parallel transport, and other differential-geometric operations that may be required by downstream cognitive processes.

In some implementations of step 618, the system combines the weighted gradient components according to $\nabla E=\alpha_{sem}\nabla E_{sem}+\alpha_{curv}\nabla E_{curv}+\alpha_{dens}\nabla E_{dens}+\alpha_{chart}\nabla E_{chart}$. The weight parameters $\alpha_i$ control the relative importance of each objective and may be adapted based on the current state of the manifold or the specific requirements of different regions. For instance, regions with high semantic uncertainty might use lower $\alpha_{sem}$, while regions approaching the injectivity radius limit might increase α_dens. The combined gradient represents the direction of steepest descent for the total geometric energy, pointing toward improved local manifold quality.

In a step 620, the system projects the gradient onto the tangent space $T_x$ M to ensure updates remain on the manifold. This projection uses the orthogonal projector $P_T=V V^T$, where V contains the orthonormal basis vectors for the tangent space computed earlier. The projection removes any component of the gradient normal to the manifold, preventing updates from pushing points off the manifold surface. This constrained optimization is essential for maintaining the manifold structure—unconstrained gradient descent would quickly destroy the low-dimensional structure by allowing points to drift into the full ambient space. The projected gradient $\nabla E_{projected}$ represents the steepest descent direction within the manifold constraint.

In a step 622, the system computes an adaptive step size $\eta$ based on local geometry and gradient magnitude. The step size selection balances rapid convergence with stability, using strategies such as the local Lipschitz constant estimated from neighbor gradients, the current curvature and injectivity radius, and backtracking line search if the energy increases. The step size may also incorporate momentum from previous iterations or use accelerated gradient methods for faster convergence. Adaptive step sizing is crucial for handling the varying geometric properties across different manifold regions—flat regions can accommodate larger steps, while highly curved or densely sampled regions require conservative updates.

At decision point 624, the system checks whether the computed step size exceeds safety thresholds that would risk violating geometric constraints. These thresholds are based on the local scale of the manifold, typically set as a fraction of the minimum neighbor distance or the estimated injectivity radius. Large steps could cause topology violations such as self-intersections or fold-overs that would be difficult to correct in subsequent iterations.

In a step 626, if the step size is too large, the system clamps it to a safe maximum value (e.g., $\eta_{max}=0.1\times\text{local}_{scale}$). This conservative limit ensures that no single update can dramatically alter the local manifold structure. The clamping preserves the gradient direction while limiting the magnitude, maintaining stability at the cost of potentially requiring more iterations for convergence. The factor 0.1 is exemplarily chosen to provide a good balance between safety and efficiency across a wide range of manifold geometries.

In a step 628, the system updates the coordinates according to $\Psi(x)\leftarrow\Psi(x)-\eta\nabla E_{projected}$. This gradient descent step moves the point in the direction that reduces the geometric energy while remaining on the manifold. The update is applied to the working copy of coordinates to allow for potential rollback if the update degrades manifold quality. The negative sign follows the convention that gradients point uphill, so descent requires moving in the opposite direction.

In a step 630, the system updates affected neighbor coordinates to maintain consistency. While the primary update focuses on the new point x, the gradient computation may indicate that neighboring points should also adjust to accommodate the new insertion. These neighbor updates are typically smaller in magnitude and help maintain smooth local geometry. The system applies these updates carefully to avoid cascading changes that could propagate through the entire manifold. Only neighbors within a tight radius of x are updated, preserving the local nature of the refinement process.

At decision point 632, the system evaluates convergence criteria to determine whether to continue iterations. Convergence may be declared when the gradient magnitude falls below a threshold, the relative change in coordinates is negligible, the geometric energy shows no significant decrease, or a maximum iteration count is reached. The iteration limit, typically 2-5 for streaming operation, prevents excessive computation while ensuring meaningful refinement. The convergence criteria balance geometric quality with computational efficiency, accepting good-enough solutions rather than pursuing perfect optimization.

In a step 634, if convergence has not been achieved, the system increments the iteration counter and returns to step 604 to begin another refinement cycle. The iterative nature allows progressive improvement of the local geometry, with each iteration building on the previous updates. The system maintains momentum information across iterations to accelerate convergence in consistent gradient directions. The loop structure ensures that the refinement process remains bounded in complexity while adapting to the local geometric requirements.

In a step 636, upon convergence, the system computes final quality metrics including local curvature measures, minimum distances to neighbors (proxy for injectivity radius), condition number of the local chart, and residual energy values. These metrics serve both as quality indicators for the current refinement and as monitoring signals for the overall manifold health. The computation reuses much of the geometric information already calculated during the flow, adding minimal overhead.

At decision point 638, the system checks whether the computed geometric invariants fall within acceptable bounds. These bounds are set based on theoretical requirements for manifold regularity and empirical observations of stable operating regions. Violations might include excessive curvature that risks folding, critically small neighbor distances approaching the injectivity limit, or poorly conditioned charts that would cause numerical instabilities. The bounds may be adaptive, tightening in regions of high confidence and relaxing when exploring novel semantic territories.

In a step 640, if geometric invariants violate acceptable bounds, the system logs these violations for the drift monitor. While the compression flow has done its best to place the point appropriately, persistent violations may indicate the need for system-level adaptations such as landmark refresh, dimensionality adjustment, or parameter tuning. The logging includes the type and magnitude of violations, the affected region of the manifold, and relevant context about the input stream. These logs feed into the drift detection algorithms that trigger adaptive maintenance.

In a step 642, the system outputs the refined coordinates to the manifold store for persistence. The storage operation includes the final coordinate vector, quality metrics for monitoring, convergence information for debugging, and update timestamps for consistency. The manifold store indexes these coordinates for efficient retrieval during future neighbor queries. The output represents the system's best estimate of where the new point belongs on the semantic manifold, balancing global consistency through harmonic extension with local optimization through compression flow.

Upon completion, the system returns control to the main projection pipeline, having completed the refinement process. The return may comprise status information indicating successful refinement or warning flags if geometric constraints could not be fully satisfied. This modular completion allows the projection pipeline to continue with subsequent points while the refined coordinates are integrated into the broader cognitive architecture.

Figure 7:
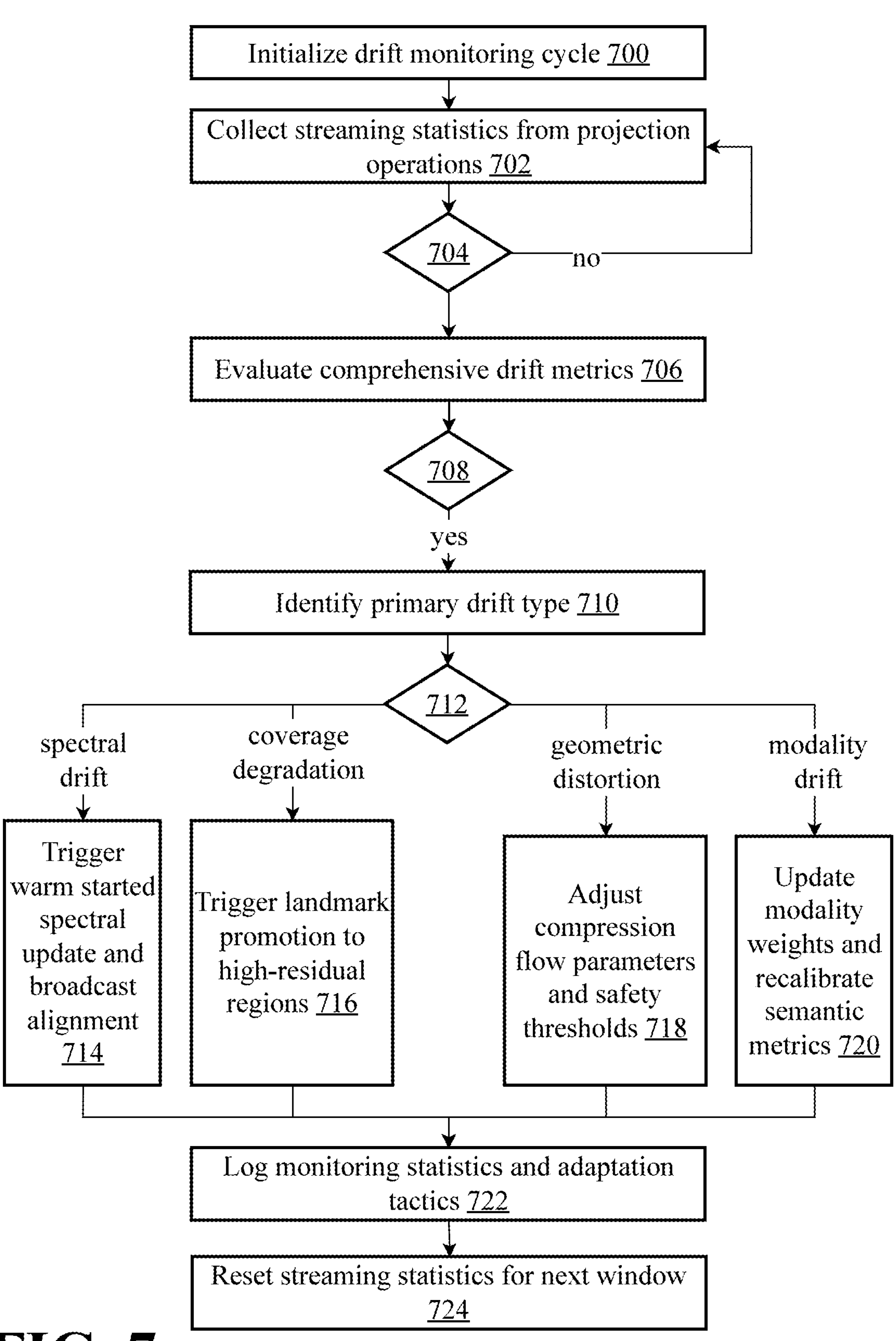
FIG. 7 is a flow diagram illustrating an exemplary method for drift monitoring and adaptive response within the adaptive geometric diffusion system, according to an embodiment.

FIG. 7 is a flow diagram illustrating an exemplary method for drift monitoring and adaptive response within the adaptive geometric diffusion system, according to an embodiment. The method supports the continuous monitoring infrastructure that detects various forms of distributional drift and geometric degradation, triggering targeted adaptive responses to maintain projection quality over indefinite operational periods. This method implements autonomous detection and adaptation based on mathematically principled geometric invariants and statistical measures. This monitoring system operates concurrently with the main projection pipeline, providing real-time quality assurance without disrupting ongoing operations.

According to the embodiment, the process begins at step 700 when the system initializes a drift monitoring cycle. These cycles run continuously in the background, aggregating statistics over sliding temporal windows that balance responsiveness to change with statistical stability. The initialization establishes monitoring buffers for various metrics, sets temporal window parameters based on data arrival rates, resets accumulators for streaming statistics, and synchronizes with other system components to ensure consistent measurement periods. The monitoring cycle typically spans hundreds to thousands of projection operations, providing sufficient data for reliable statistical inference while remaining responsive to rapid changes in the input distribution.

In a step 702, the system collects streaming statistics from ongoing projection operations. Rather than storing raw data, which would be prohibitive at scale, the system maintains compact statistical summaries that can be updated incrementally. These statistics may comprise, but are not limited to, projection residuals from harmonic extension, convergence behavior of compression flow iterations, neighbor distance distributions on the manifold, computational costs for various operations, and success rates for geometric constraint satisfaction. The collection process is designed to have minimal overhead, piggybacking on computations already performed during normal projection operations. Each projection contributes its measurements to the appropriate streaming estimators without requiring additional passes over the data.

In a step 702, the system collects streaming statistics from ongoing projection operations. Rather than storing raw data, which would be prohibitive at scale, the system maintains compact statistical summaries that can be updated incrementally. These statistics encompass various categories including, but not limited to: residual distribution metrics tracking projection quality through harmonic extension residuals, spectral stability metrics monitoring the evolution of eigenvalues and eigenvectors, geometric invariant metrics characterizing manifold shape through curvature and injectivity measures, and modality reliability metrics assessing the consistency and quality of different cortical inputs. The collection process is designed to have minimal overhead, piggybacking on computations already performed during normal projection operations. Each category employs streaming algorithms such as Welford's method for moments, P-square for quantiles, and exponentially weighted averages for trends.

At decision point 704, the system determines whether the current monitoring window is complete. Window completion may be triggered by reaching a predetermined number of projections, elapsed wall-clock time, or detection of significant events that warrant immediate evaluation. The windowing strategy balances statistical reliability requiring sufficient samples against responsiveness to rapid changes. Adaptive windowing may shorten intervals when high variance is detected or lengthen them during stable periods to reduce computational overhead.

In a step 706, upon window completion, the system evaluates comprehensive drift metrics across all monitoring categories. This evaluation includes computing principal angles between the current spectral basis and reference bases to detect structural rotation, evaluating the spectral gap ratio $(\lambda m+_{1}-\lambda_{m})/\lambda_{m}$ to ensure stable dimensionality reduction, assessing curvature distribution statistics to identify geometric distortion, calculating injectivity radius estimates based on minimum neighbor distances, and analyzing residual quantile trends to detect systematic coverage degradation. These metrics are computed efficiently using accumulated statistics rather than requiring passes over raw data. The comprehensive evaluation provides a multi-faceted view of system health, enabling detection of various drift modalities that might be masked by examining any single metric in isolation.

At decision point 708, the system evaluates whether any monitored metric exceeds its critical threshold. These thresholds are set based on theoretical requirements for manifold regularity, empirical stability boundaries, and adaptive percentiles of historical values. The thresholds implement a hierarchy of responses, with minor violations triggering increased monitoring and major violations initiating corrective actions. The evaluation considers not just individual metrics but also patterns across multiple indicators that might signal compound drift scenarios.

In a step 710, when critical thresholds are exceeded, the system identifies the primary drift type based on which metrics show the most significant violations. This categorization considers patterns across multiple indicators, temporal ordering of violations, and severity scores. The identification process may detect compound drift scenarios requiring multiple adaptations. Accurate drift classification ensures that subsequent adaptations address root causes rather than symptoms.

At decision point 712, the system branches to specific adaptation strategies based on the identified drift type, with each type requiring targeted corrective actions:

In a step 714, for spectral drift, the system triggers a warm-started spectral update using the processes described herein (e.g., FIG. 4). This may comprise preparing warm-start vectors from the current basis, computing the updated spectral decomposition, and broadcasting rotation matrices to align existing coordinates with the new basis. The warm-starting ensures efficient computation while the broadcast maintains system-wide consistency.

In a step 716, for coverage degradation, the system triggers landmark promotion to improve representation in under-covered regions. This process identifies high-residual areas from the accumulated statistics, selects representative candidates, and updates the landmark set as described herein. The targeted addition of landmarks addresses coverage gaps without unnecessarily expanding the landmark set globally.

In a step 718, for geometric distortion, the system adjusts compression flow parameters including the weights of different energy terms, step size limits, and safety thresholds. These adjustments target specific geometric issues—increasing curvature penalties in highly curved regions, strengthening density regularization where points cluster, or modifying convergence criteria to ensure geometric constraints are satisfied.

In a step 720, for modality drift, the system updates the relative weights $\alpha_j$ of different cortical inputs based on their reliability scores and recalibrates semantic metrics for drifting modalities. Modalities showing high residuals or inconsistency see reduced weights, while stable modalities gain increased influence. The recalibration adapts to changed distributional characteristics while maintaining backward compatibility.

In a step 722, the system logs comprehensive monitoring statistics and adaptation actions. This logging provides audit trails, enables offline analysis of drift patterns, and creates data for system improvement. The structured logs capture metric values, threshold violations, adaptation decisions, and outcome measures.

In a step 724, the system resets streaming statistics for the next monitoring window. The reset is selective, preserving long-term trends while clearing short-term accumulators. This ensures fresh measurements for each window while maintaining continuity for trend analysis. The system returns to main system operation, having completed the monitoring and adaptation cycle. The return may comprise status flags indicating any active adaptations and updated parameters propagated to relevant components.

Figure 8:
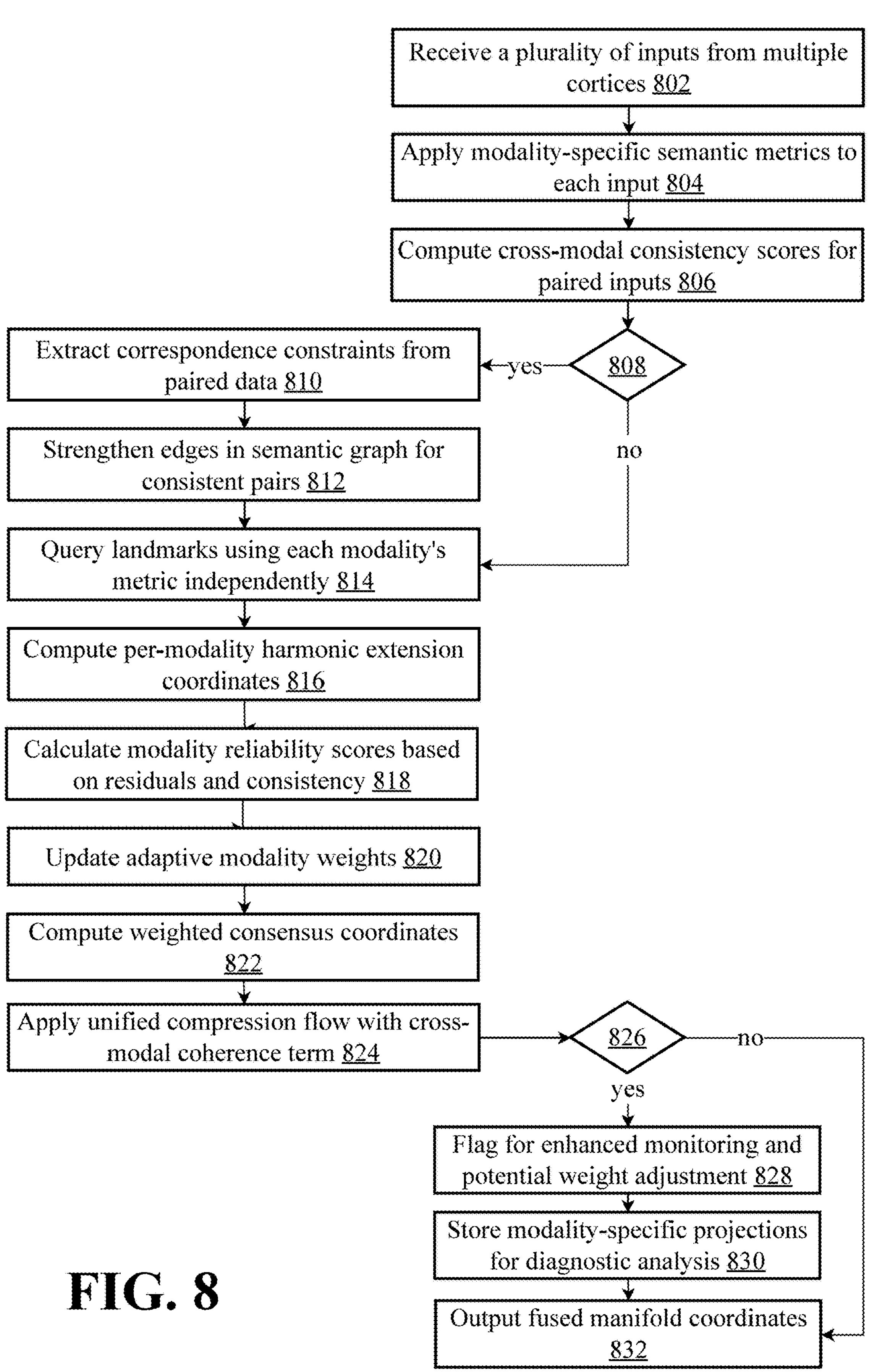
FIG. 8 is a flow diagram illustrating an exemplary method for multimodal fusion within the adaptive geometric diffusion system, according to an embodiment.

FIG. 8 is a flow diagram illustrating an exemplary method for multimodal fusion within the adaptive geometric diffusion system, according to an embodiment. The method represents a sophisticated process by which the AGD system combines heterogeneous inputs from multiple cortical sources into a unified manifold representation that preserves the semantic structure of each modality while discovering cross-modal relationships. The method implements a principled geometric fusion that adapts to the relative reliability and consistency of different modalities, enabling robust projection even when individual modalities are noisy, incomplete, or drifting. This multimodal capability is essential for cognitive architectures that must integrate diverse information sources such as visual, auditory, linguistic, and temporal signals into a coherent representation.

According to an embodiment, the process begins when the system begins the multimodal fusion process for inputs arriving from J different cortices. Each cortex represents a distinct processing pathway with its own latent space dimensionality, semantic structure, and reliability characteristics. The fusion process must accommodate cortices that may operate at different sampling rates, have varying levels of noise or uncertainty, represent complementary or redundant information, and experience independent distribution drift over time. The initialization prepares fusion buffers, synchronization mechanisms, and weight adaptation structures needed to handle this heterogeneity while maintaining computational efficiency.

In a step 802, the system receives concurrent inputs from multiple cortical sources. These inputs may arrive synchronously as part of a multimodal observation (e.g., simultaneous visual and auditory signals) or asynchronously as different cortices process information at different rates. The receiving mechanism maintains temporal alignment windows that group related inputs while accommodating processing delays. Each input carries metadata identifying its source cortex, timestamp, and any confidence measures provided by the cortical processing. The system buffers these inputs appropriately to enable both independent processing and cross-modal analysis.

In a step 804, the system applies modality-specific semantic metrics to each input. These metrics have been tailored to capture the notion of similarity appropriate to each modality—perceptual distance for vision, phonetic similarity for speech, semantic relatedness for language, or temporal proximity for sequential data. The application of separate metrics ensures that each modality's unique structure is respected rather than forcing all inputs through a common distance function that might lose important distinctions. The metrics may be pre-defined based on domain knowledge, learned from modality-specific training data, or adapted online based on observed statistics.

In a step 806, the system computes cross-modal consistency scores for inputs that may represent the same underlying entity or event across different modalities. For instance, a visual representation of an object and its spoken name should project to nearby regions on the manifold despite originating from different cortices with different latent representations. The consistency scoring examines temporal coincidence suggesting related observations, semantic correspondence based on known cross-modal relationships, and statistical correlation patterns learned from previous projections. These scores provide crucial information for aligning different modalities in the unified manifold.

At decision point 808, the system determines whether cross-modal pairs are available for the current inputs. In many scenarios, explicit pairing information exists—such as synchronized audio-visual streams or image-caption pairs. However, the system must also handle unpaired data where modalities operate independently. The presence of pairs enables stronger fusion through explicit correspondence constraints, while unpaired data relies more heavily on statistical alignment and semantic similarity.

In a step 810, when paired data is available, the system extracts correspondence constraints that will guide the fusion process. These constraints indicate that certain inputs across modalities should map to identical or nearby locations on the manifold. The extraction process identifies high-confidence pairs based on synchronization or explicit labeling, estimates the strength of correspondence based on pairing reliability, and prepares constraint edges for the semantic graph construction. These constraints provide powerful supervision for learning cross-modal alignments without requiring manual annotation.

In a step 812, the system strengthens edges in the semantic graph between points that show cross-modal consistency. The semantic graph, used in constructing the diffusion kernel, now includes both within-modality edges based on semantic similarity and cross-modality edges based on correspondence. Strengthening these edges ensures that the subsequent spectral decomposition will tend to place corresponding points nearby in the manifold representation. The edge weights are calibrated to balance within-modality structure preservation with cross-modal alignment, preventing any single modality from dominating the representation.

In a step 814, the system queries landmarks using each modality's metric independently. Rather than forcing a common metric across all modalities, which could lead to meaningless comparisons, each input finds its nearest landmarks among those originating from the same or compatible modalities. This modality-aware querying ensures that interpolation happens between semantically meaningful reference points. The system maintains separate approximate nearest neighbor indices for each modality, optimized for their specific metrics and query patterns. The number of landmarks L may vary by modality based on their individual complexity and coverage requirements.

In a step 816, the system computes per-modality harmonic extension coordinates. Each modality's input is projected independently using its own landmarks and interpolation weights, producing modality-specific coordinates $\Psi^j x^j$. This parallel processing respects the unique geometric structure of each modality while preparing for subsequent fusion. The independent projections also serve as diagnostic tools—large discrepancies between modality-specific projections of paired data indicate potential issues with metrics, landmarks, or data quality that warrant investigation.

In a step 818, the system calculates modality reliability scores based on projection quality indicators. These scores assess how well each modality is currently being represented by the projection infrastructure. Reliability metrics include average residuals indicating coverage quality, consistency of paired projections measuring cross-modal agreement, temporal stability of projections from the same modality, and concentration of interpolation weights suggesting landmark adequacy. Modalities experiencing distribution drift, sensor degradation, or poor landmark coverage receive lower reliability scores, reducing their influence in the fusion process.

In a step 820, the system updates adaptive modality weights $\alpha_j$ based on the computed reliability scores. These weights control the relative influence of each modality in constructing the fused representation. The update uses a soft combination of current reliability and historical performance, preventing rapid fluctuations while remaining responsive to genuine changes. The weights are normalized to sum to unity, ensuring that the fusion remains a proper convex combination. Adaptive weighting allows the system to gracefully handle scenarios where one or more modalities become temporarily unreliable without disrupting the overall projection quality.

In a step 822, the system computes weighted consensus coordinates using the formula $\Psi_{consensus}=\Sigma_j\alpha_j\Psi^j(x^j)$. This weighted average combines the per-modality projections according to their current reliability, producing a unified representation that reflects the consensus across modalities. When modalities agree, the consensus naturally falls in their common projection region. When modalities disagree, more reliable modalities have greater influence in determining the final position. The consensus coordinates serve as the initial unified representation before refinement through compression flow.

In a step 824, the system applies a unified compression flow that includes a cross-modal coherence term in its energy functional. Beyond the standard geometric energy terms (semantic coherence, curvature penalty, density regularization, chart conditioning), the multimodal compression flow adds a term that encourages corresponding points from different modalities to remain nearby on the manifold. This term is weighted by the confidence in cross-modal correspondences and the reliability of the involved modalities. The unified flow ensures that the final manifold positions satisfy both within-modality geometric constraints and cross-modal alignment objectives.

At decision point 826, the system evaluates whether significant modality disagreement has been detected during the fusion process. Disagreement is measured by the spread of per-modality projections for supposedly corresponding points, violation of known cross-modal constraints, or anomalous patterns in the consensus computation. Significant disagreement may indicate sensor failures, distribution shift in specific modalities, or genuinely ambiguous inputs that admit multiple interpretations. The detection threshold is calibrated to distinguish meaningful disagreements from normal projection variance.

In a step 828, when significant disagreement is detected, the system flags the projection for enhanced monitoring and potential weight adjustment. The flagging mechanism alerts the drift monitoring system to pay special attention to the affected modalities and regions of the manifold. This may trigger accelerated weight adaptation to reduce the influence of problematic modalities, focused landmark addition in ambiguous regions, or diagnostic logging for offline analysis. The flags are propagated with the projection results to inform downstream processing that uncertainty may be elevated.

In a step 830, the system stores modality-specific projections alongside the consensus for diagnostic analysis. These individual projections provide valuable information for understanding system behavior, debugging fusion issues, and improving modality metrics or weights. The storage includes the per-modality coordinates $\Psi^j$, reliability scores and weight values, disagreement measures and flag states, and relevant metadata for trajectory analysis. This diagnostic information supports both online adaptation and offline system improvement without impacting the runtime efficiency of the fusion process.

In a step 832, the system outputs the final fused manifold coordinates resulting from the multimodal fusion process. These coordinates represent the system's best estimate of where the multimodal input should be positioned on the semantic manifold, taking into account all available modalities weighted by their reliability. The output maintains the low dimensionality m of the target manifold while capturing the essential semantic content from potentially dozens or hundreds of input dimensions across all modalities. The fused coordinates enable downstream processing that can leverage the full multimodal context without dealing with the complexity of heterogeneous representations.

The system returns control to the main projection pipeline upon completing the multimodal fusion. The return includes not only the fused coordinates but also metadata about the fusion process such as effective modality weights used, confidence measures based on agreement, and any warning flags raised during processing. This rich output enables the broader system to make informed decisions about how to use the projection while maintaining awareness of its reliability and provenance.

The methods and processes described herein are illustrative examples and should not be construed as limiting the scope or applicability of the manifold projection platform. These exemplary implementations serve to demonstrate the versatility and adaptability of the platform. It is important to note that the described methods may be executed with varying numbers of steps, potentially including additional steps not explicitly outlined or omitting certain described steps, while still maintaining core functionality. The modular and flexible nature of the manifold projection platform allows for numerous alternative implementations and variations tailored to specific use cases or technological environments. As the field evolves, it is anticipated that novel methods and applications will emerge, leveraging the fundamental principles and components of the platform in innovative ways. Therefore, the examples provided should be viewed as a foundation upon which further innovations can be built, rather than an exhaustive representation of the platform's capabilities.

Exemplary Computing Environment

Figure 9:
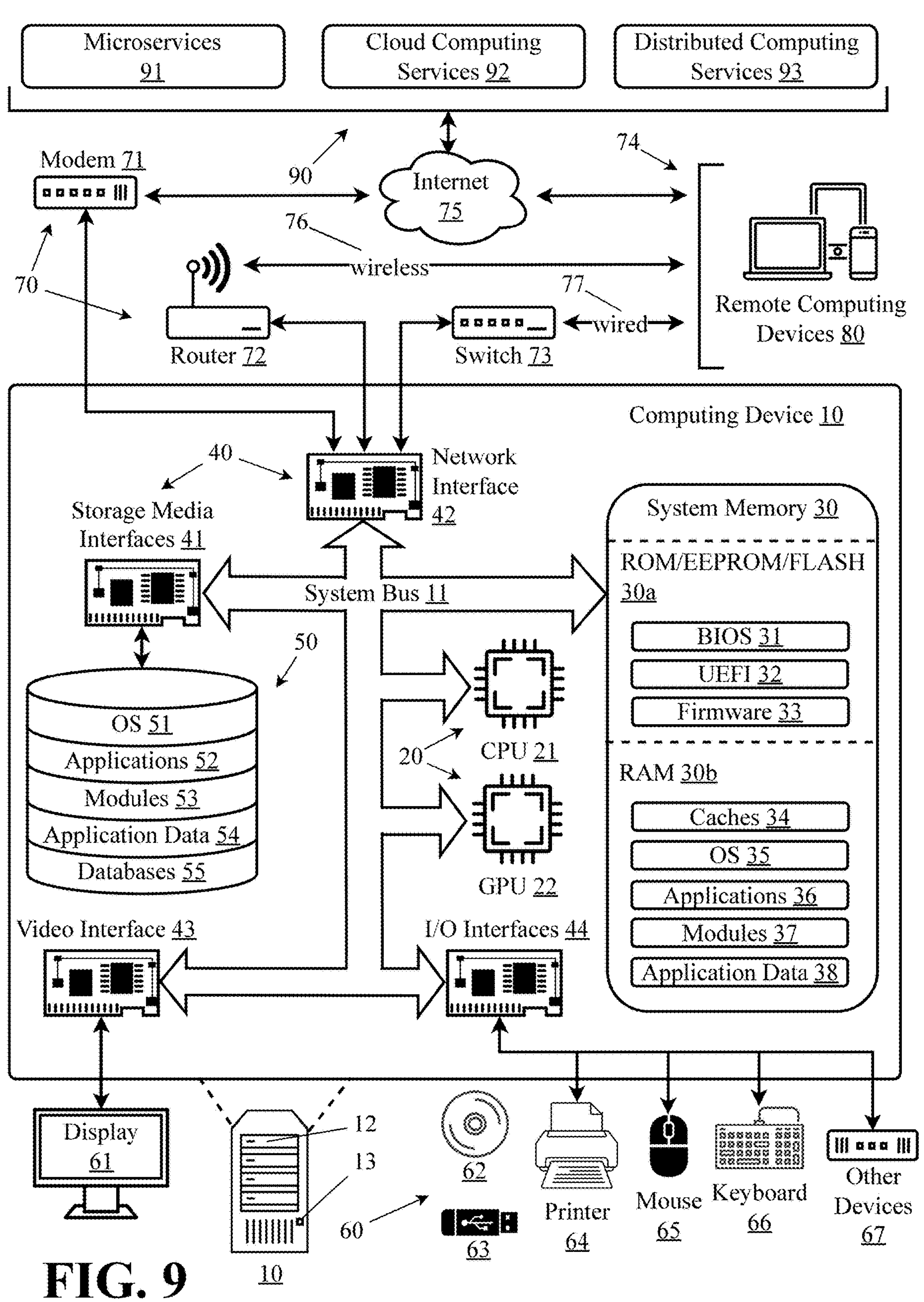
FIG. 9 illustrates an exemplary computing environment on which an embodiment described herein may be implemented.

FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A projection system for mapping heterogeneous high-dimensional representations onto a shared manifold, comprising:
  - a processor;
  - a memory storing instructions that, when executed by the processor, cause the system to:
  - maintain a set of landmark points in one or more source spaces;
  - compute spectral coordinates for the landmark points based on a graph constructed using semantic similarity relationships between the landmark points;
  - receive an input point from a source space;

determine manifold coordinates for the input point by:
identifying a subset of semantically similar landmarks;
computing interpolation weights based on semantic distances; and
calculating a weighted combination of spectral coordinates of the identified landmarks;
refine the determined manifold coordinates through a geometric optimization process that maintains local manifold constraints; and
monitor one or more geometric invariants of the manifold and adaptively update at least one of the landmark points or the spectral coordinates when a monitored geometric invariant exceeds a threshold to maintain geometry quality; wherein the threshold is used to determine minor violation triggering increased monitoring or major violation initiating corrective action.

2. The projection system of claim 1, wherein computing spectral coordinates comprises:
constructing a kernel matrix using exponential weights of semantic distances between landmark points;
generating a normalized graph Laplacian from the kernel matrix; and
performing eigen decomposition to obtain eigenvectors that define the spectral coordinates.

3. The projection system of claim 1, wherein the geometric optimization process comprises:
computing a gradient of a geometric energy functional that includes at least one of a semantic coherence term, a curvature penalty term, a density regularization term, or a chart conditioning term;
projecting the gradient onto a local tangent space estimated from neighboring manifold points; and
updating the manifold coordinates using a step size bounded by local geometric constraints.

4. The projection system of claim 1, wherein the one or more geometric invariants comprise at least one of principal angles between a current spectral basis and a reference spectral basis, a spectral gap ratio computed as a difference between consecutive eigenvalues divided by the smaller eigenvalue, statistical measures of local curvature across the manifold, or an injectivity radius estimate based on minimum distances between manifold points.

5. The projection system of claim 1, wherein the system is further configured to:
receive input points from a plurality of heterogeneous source spaces corresponding to different modalities;
maintain separate semantic metrics for each modality; and
compute consensus manifold coordinates by weighted combination of modality-specific projections.

6. The projection system of claim 5, wherein the system is further configured to:
compute reliability scores for each modality based on at least one of projection residuals, temporal stability, or cross-modal consistency;
adaptively update weights for each modality based on the reliability scores; and
apply the updated weights when computing consensus manifold coordinates.

7. The projection system of claim 1, wherein adaptively updating the landmark points comprises:
identifying regions of the source space with projection residuals exceeding a coverage threshold;
selecting candidate points from high-residual regions based on at least one of centrality, stability, or representativeness; and
adding selected candidates to the set of landmark points.

8. The projection system of claim 1, wherein the system is further configured to:
store the determined manifold coordinates in a manifold store;
maintain a nearest neighbor index structure on the manifold coordinates to support efficient neighborhood queries; and
update only local neighborhoods affected by new input points during the geometric optimization process.

9. The projection system of claim 1, wherein adaptively updating the spectral coordinates comprises:
using previous spectral coordinates as initial conditions for an iterative eigen decomposition solver;
performing warm-started iterations until convergence; and
broadcasting rotation matrices to align existing manifold coordinates with updated spectral coordinates.

10. The projection system of claim 1, wherein the system is further configured to:
maintain the landmark points and spectral coordinates in a federated manner across multiple sites;
share only spectral coefficients and landmark summaries between sites without sharing raw data; and
align spectral bases across sites using a common set of anchor points.

11. A computer-implemented method for projecting heterogeneous high-dimensional representations onto a shared manifold, comprising the steps of:
maintaining a set of landmark points in one or more source spaces;
computing spectral coordinates for the landmark points based on a graph constructed using semantic similarity relationships between the landmark points;
receiving an input point from a source space;
determining manifold coordinates for the input point by:
identifying a subset of semantically similar landmarks;
computing interpolation weights based on semantic distances; and
calculating a weighted combination of spectral coordinates of the identified landmarks;
refining the determined manifold coordinates through a geometric optimization process that maintains local manifold constraints; and
monitoring one or more geometric invariants of the manifold and adaptively updating at least one of the landmark points or the spectral coordinates when a monitored geometric invariant exceeds a threshold to maintain geometry quality;
wherein the threshold is used to determine minor violation triggering increased monitoring or major violation initiating corrective action.

12. The computer-implemented method of claim 11, wherein computing spectral coordinates comprises:
constructing a kernel matrix using exponential weights of semantic distances between landmark points;
generating a normalized graph Laplacian from the kernel matrix; and
performing eigen decomposition to obtain eigenvectors that define the spectral coordinates.

13. The computer-implemented method of claim 11, wherein the geometric optimization process comprises:
computing a gradient of a geometric energy functional that includes at least one of a semantic coherence term, a curvature penalty term, a density regularization term, or a chart conditioning term;
projecting the gradient onto a local tangent space estimated from neighboring manifold points; and updating the manifold coordinates using a step size bounded by local geometric constraints.

14. The computer-implemented method of claim 11, wherein the one or more geometric invariants comprise at least one of principal angles between a current spectral basis and a reference spectral basis, a spectral gap ratio computed as a difference between consecutive eigenvalues divided by the smaller eigenvalue, statistical measures of local curvature across the manifold, or an injectivity radius estimate based on minimum distances between manifold points.

15. The computer-implemented method of claim 11, further comprising the steps of:

receiving input points from a plurality of heterogeneous source spaces corresponding to different modalities;

maintaining separate semantic metrics for each modality; and computing consensus manifold coordinates by weighted combination of modality-specific projections.

16. The computer-implemented method of claim 15, further comprising the steps of:

computing reliability scores for each modality based on at least one of projection residuals, temporal stability, or cross-modal consistency;

adaptively updating weights for each modality based on the reliability scores; and applying the updated weights when computing consensus manifold coordinates.

17. The computer-implemented method of claim 11, wherein adaptively updating the landmark points comprises:

identifying regions of the source space with projection residuals exceeding a coverage threshold;

selecting candidate points from high-residual regions based on at least one of centrality, stability, or representativeness; and adding selected candidates to the set of landmark points.

18. The computer-implemented method of claim 11, further comprising the steps of:

storing the determined manifold coordinates in a manifold store;

maintaining a nearest neighbor index structure on the manifold coordinates to support efficient neighborhood queries; and updating only local neighborhoods affected by new input points during the geometric optimization process.

19. The computer-implemented method of claim 11, wherein adaptively updating the spectral coordinates comprises:

using previous spectral coordinates as initial conditions for an iterative eigen decomposition solver;

performing warm-started iterations until convergence; and broadcasting rotation matrices to align existing manifold coordinates with updated spectral coordinates.

20. The computer-implemented method of claim 11, further comprising:

maintaining the landmark points and spectral coordinates in a federated manner across multiple sites;

sharing only spectral coefficients and landmark summaries between sites without sharing raw data; and aligning spectral bases across sites using a common set of anchor points.

* * * * *